United States Patent
Miyairi et al.

(10) Patent No.: US 9,777,714 B2
(45) Date of Patent: Oct. 3, 2017

(54) HEAT/ACOUSTIC WAVE CONVERSION COMPONENT AND HEAT/ACOUSTIC WAVE CONVERSION UNIT

(71) Applicant: NGK Insulators, Ltd., Nagoya (JP)

(72) Inventors: Yukio Miyairi, Nagoya (JP); Shinichi Miwa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 146 days.

(21) Appl. No.: 14/934,487

(22) Filed: Nov. 6, 2015

(65) Prior Publication Data
US 2016/0131114 A1   May 12, 2016

(30) Foreign Application Priority Data

Nov. 11, 2014 (JP) .................. 2014-229094

(51) Int. Cl.
*F02G 1/053* (2006.01)
*F03G 7/00* (2006.01)

(52) U.S. Cl.
CPC ..................... *F03G 7/00* (2013.01)

(58) Field of Classification Search
CPC ........ F02G 1/053; F02G 5/02; F02G 2243/54; F25B 9/14; F25B 9/145; F25B 2309/1402; F25B 2309/1403; F25B 2309/1405; F25B 2309/1412; F25B 2309/1413
See application file for complete search history.

(56) References Cited

FOREIGN PATENT DOCUMENTS

| JP | 2005-180294 A1 | 7/2005 |
| JP | 2012-112621 A1 | 6/2012 |
| JP | 2012-237295 A1 | 12/2012 |

OTHER PUBLICATIONS

U.S. Appl. No. 14/851,569, filed Sep. 11, 2015, Miyairi et al.
U.S. Appl. No. 14/851,628, filed Sep. 11, 2015, Miyairi et al.
U.S. Appl. No. 14/853,015, filed Sep. 14, 2015, Miyairi et al.
U.S. Appl. No. 14/849,984, filed Sep. 10, 2015, Miyairi et al.
U.S. Appl. No. 14/853,084, filed Sep. 14, 2015, Miyairi et al.
M. Lee, et al., "*Micro Thermophotovoltaic Power Generation System,*" http://www.mesl.t.u-tokyo.ac.jp/en/research/tpv.html, Yuji Suzuki and Kenichi Morimoto Lab., The University of Tokyo (with English translation).
Toshihiro Kanematsu, et al., "*A New Method of Fabricating Micro Honeycomb Structure by Controlling Gas Pressure,*" http://www.ricoh.com/ja/technology/tech/009_honeycomb.html, Ricoh Technical Report No. 35, Dec. 2009, pp. 80-86.

*Primary Examiner* — Jonathan Matthias
(74) *Attorney, Agent, or Firm* — Burr & Brown, PLLC

(57) ABSTRACT

A heat/acoustic wave conversion component includes a partition wall that defines a plurality of cells extending from a first end face to a second end face, and has a cell hydraulic diameter HD of 0.4 mm or less, an end face open frontal area of 60% or more and 93% or less, and heat capacity per unit length in the extending direction that tends to decrease with distance from the first end face. A first end portion on the first end face side that accounts for a region of 10% of a total length of the heat/acoustic wave conversion component has 1.1 times or more the heat capacity of that of a second end portion on the second end face side that accounts for a region of 10% of the total length.

12 Claims, 12 Drawing Sheets

HIGH-TEMPERATURE
HEATED FLUID

HEAT/ACOUSTIC WAVE CONVERSION COMPONENT AND HEAT/ACOUSTIC WAVE CONVERSION UNIT

The present application is an application based on JP 2014-229094 filed on Nov. 11, 2014 with Japan Patent Office, the entire contents of which are incorporated herein by reference.

BACKGROUND OF THE INVENTION

1. Field of the Invention

The present invention relates to heat/acoustic wave conversion components and heat/acoustic wave conversion units. More particularly, the present invention relates to a heat/acoustic wave conversion component to convert heat and acoustic-wave energy mutually, and a heat/acoustic wave conversion unit including a heat/acoustic wave conversion component and a heat exchanger.

2. Description of the Related Art

Recently society as a whole has been becoming more and more interested in effective use of energy resources, and so various techniques to reuse energy have been developed on a trial basis. Among them, an energy recycling system attracts attention because the acquisition rate (energy efficiency) of the energy acquired is high. The energy recycling system converts heat of high-temperature fluid, such as exhaust gas from automobiles, to acoustic-wave energy by a thermoacoustic effect, and finally outputs such energy in the form of electric power. Various efforts have been made toward the practical use of such a system.

Simply speaking, a thermoacoustic effect is a phenomenon to generate acoustic waves using heat. More specifically, the thermoacoustic effect is a phenomenon to oscillate an acoustic-wave transmitting medium in the thin tube to generate acoustic waves when heat is applied to one end part of a thin tube to form a temperature gradient at the thin tube. Since it is effective to generate acoustic waves using a large number of such thin tubes at one time, a honeycomb structure including a large number of through holes each having a small diameter is often used as a collective form of the thin tubes causing a thermoacoustic effect (see e.g., Patent Documents 1 to 3).

Meanwhile the honeycomb structure itself has been used for various purposes, without reference to the thermoacoustic effect, because of its three-dimensional geometry having a large surface area. For instance, a typical example is a honeycomb structure to load catalyst for exhaust purification to remove fine particles from exhaust gas of automobiles, and various types of structures have been developed conventionally. Another example is a honeycomb structure having small through holes of a few tens to a few hundreds μm in diameter, which is developed as an ion catalyst (see Non-Patent Documents 1, 2, for example). They are manufactured by a chemical method solely, which is totally different from extrusion that is typically used for honeycomb structures as filters.

In this way, although honeycomb structures have been well known conventionally, they are required to have specific properties to be suitable for a thermoacoustic effect when these structures are used as heat/acoustic wave conversion components to exert the thermoacoustic effect. For example, in order to exert a high thermoacoustic effect, the through holes preferably have a small diameter, and Patent Document 3 proposes a honeycomb structure for a thermoacoustic effect, including through holes having a diameter of 0.5 mm or more and less 1.0 mm that is smaller than that of honeycomb structures to load catalyst for exhaust purification. Although the honeycomb structures in Non-Patent Documents 1 and 2 have a very small pore diameter, they are manufactured by a chemical method solely, and so they have limited lengths and durability and so are not suitable for the honeycomb structure for a thermoacoustic effect very much. On the other hand, the honeycomb structure for a thermoacoustic effect of Patent Document 3 satisfies a necessary condition that is durable in the use as a heat/acoustic wave conversion component to exert a thermoacoustic effect, and then has the advantage of having an excellent heat/acoustic wave conversion function.

[Patent Document 1] JP-A-2005-180294
[Patent Document 2] JP-A-2012-112621
[Patent Document 3] JP-A-2012-237295
[Non-Patent Document 1] URL:http://www.mesl.t.u-tokyo.ac.jp/ja/research/tpv.html on the Internet
[Non-Patent Document 2] URL:http://www.ricoh.com/ja/technology/tech/009_honeycomb.html on the Internet

SUMMARY OF THE INVENTION

However, various other structural factors that contribute to improve a heat/acoustic-wave conversion function can be considered in addition to a smaller diameter of the through holes. For instance, in order to exert an excellent heat/acoustic-wave conversion function continuously, an enough temperature gradient formed at both ends of the honeycomb structure has to be kept. Then, in order to keep such an enough temperature gradient, the honeycomb structure is required to have a devised structure, aside from the improvement in performance of an external heating mechanism to heat the ends of the honeycomb structure. In this way, more improvement is desired to enhance such a heat/acoustic-wave conversion function.

In view of the above-mentioned circumstances, the present invention aims to provide a heat/acoustic wave conversion component having a structure suitable to keep a temperature gradient, and a heat/acoustic wave conversion unit including such a heat/acoustic wave conversion component and a heat exchanger.

To fulfill the above-mentioned object, the present invention provides the following heat/acoustic wave conversion component and heat/acoustic wave conversion unit.

[1] A heat/acoustic wave conversion component having a first end face and a second end face, including a partition wall that defines a plurality of cells extending from the first end face to the second end face, inside of the cells being filled with working fluid that oscillates to transmit acoustic waves, the heat/acoustic wave conversion component mutually converting heat exchanged between the partition wall and the working fluid and energy of acoustic waves resulting from oscillations of the working fluid, wherein the heat/acoustic wave conversion component has a hydraulic diameter HD that is 0.4 mm or less, the hydraulic diameter HD being defined as $HD=4 \times S/C$, where S denotes an area of a cross section of each cell perpendicular to the cell extending direction and C denotes a perimeter of the cross section, the heat/acoustic wave conversion component has an open frontal area at each end face of 60% or more and 93% or less, the heat/acoustic wave conversion component has heat capacity per unit length in the extending direction that tends to decrease with distance from the first end face in the extending direction, and the heat/acoustic wave conversion component has a first end portion on the first end face side that accounts for a region of 10% of a total length of the heat/acoustic wave conversion component in the extending direction, and a second end portion on the second end face side that accounts for a region of 10% of the total length of the heat/acoustic wave conversion component in the extending direction, the first end portion having heat capacity that is 1.1 times or more the heat capacity of the second end portion.

[2] The heat/acoustic wave conversion component according to [1] including: a plurality of monolithic honeycomb segments each including a partition wall that defines a plurality of cells extending between two end faces of each honeycomb segment, inside of the cells being filled with the working fluid, the honeycomb segments mutually converting heat exchanged between the partition wall and the working fluid and energy of acoustic waves resulting from oscillations of the working fluid, wherein the heat/acoustic wave conversion component includes the plurality of honeycomb segments that are arranged serially from the first end face to the second so that one end face of each honeycomb segment abuts one end face of another honeycomb segment of the plurality of honeycomb segments, the cells of each of the plurality of honeycomb segments have a hydraulic diameter that is 0.4 mm or less, each of the plurality of honeycomb segments has an open frontal area at each end face of 60% or more and 93% or less, the plurality of honeycomb segments have mutually different heat capacities per unit length in the extending direction, and are arranged serially in a descending order of heat capacity per unit length in the extending direction from the first end face to the second end face, a first honeycomb segment of the serially arranged plurality of honeycomb segments that has the first end face as one end face thereof includes the first end portion of the heat/acoustic wave conversion component, and a second honeycomb segment of the serially arranged plurality of honeycomb segments that has the second end face as one end face thereof includes the second end portion of the heat/acoustic wave conversion component. Here, the state in which "one end face of each honeycomb segment abuts one end face of another honeycomb segment" includes a state in which end faces of two neighboring honeycomb segments are opposed to each other with bonding material between the end faces, and a state in which end faces of two neighboring honeycomb segments are opposed to each other with a minute gap between the end faces so as not to affect the transmission of acoustic waves, in addition to a state in which end faces of two neighboring honeycomb segments are directly in contact with each other.

[3] In the heat/acoustic wave conversion component according to [2], heat capacity per unit volume of the first honeycomb segment is the same as heat capacity per unit volume of the second honeycomb segment, and an equivalent circle diameter of the first honeycomb segment is 1.05 times or more an equivalent circle diameter of the second honeycomb segment.

[4] In the heat/acoustic wave conversion component according to [2], heat capacity per unit volume of the first honeycomb segment is 1.1 times or more heat capacity per unit volume of the second honeycomb segment, and an equivalent circle diameter of the first honeycomb segment is the same as an equivalent circle diameter of the second honeycomb segment.

[5] A heat/acoustic wave conversion unit, including the heat/acoustic wave conversion component according to any one of [1] to [4], in a state where inside of the plurality of cells is filled with the working fluid and when there is a temperature difference between the first end portion and the second, the heat/acoustic wave conversion component oscillating the working fluid in the extending direction in accordance with the temperature difference and generating acoustic waves; and a pair of heat exchangers that are disposed in a vicinity of the first end portion and the second end portion of the heat/acoustic wave conversion component, respectively, the heat exchangers exchanging heat with the both end portions to give a temperature difference between the both end portions.

[6] A heat/acoustic wave conversion unit including: the heat/acoustic wave conversion component according to any one of [1] to [4], in a state where inside of the plurality of cells is filled with the working fluid, and when the working fluid oscillates in the extending direction while receiving acoustic waves transmitted, the heat/acoustic wave conversion component generating a temperature difference between the first end portion and the second end portion in accordance with oscillations of the working fluid; a heat exchanger that is disposed in a vicinity of one of the first end portion and the second end portion of the heat/acoustic wave conversion component, the heat exchanger supplying heat to the one end portion or absorbing heat from the one end portion to keep a temperature at the one end portion constant; and a hot heat/cold heat output unit that is disposed in a vicinity of the other of the first end portion and the second end portion of the heat/acoustic wave conversion component, the hot heat/cold heat output unit outputting hot heat or cold heat obtained by exchanging of heat with the other end portion so that, in a state where the temperature of the one end portion is kept constant by the heat exchanger and when the heat/acoustic wave conversion component receives acoustic waves transmitted, the other end portion has a temperature difference in accordance with oscillations of the working fluid due to transmission of the acoustic waves with reference to the one end portion kept at the constant temperature. Here, "outputting hot heat or cold heat" means, for example, "outputting fluid whose temperature is increased or fluid whose temperature is decreased".

The heat/acoustic wave conversion component of the present invention has a hydraulic diameter HD that is 0.4 mm or less and an open frontal area at each end face of 60% or more and 93% or less, and additionally a first end portion that accounts for a region of 10% of a total length of the heat/acoustic wave conversion component in the cell penetrating direction has heat capacity that is 1.1 times or more the heat capacity of a second end portion that accounts for a region of 10% of a total length of the heat/acoustic wave conversion component in the cell penetrating direction. With this configuration, the temperature gradient between both ends of the heat/acoustic wave conversion component can be kept easily. As a result, sufficient energy conversion efficiency can be achieved when heat is converted into acoustic wave energy by a thermoacoustic effect.

DESCRIPTION OF THE PREFERRED EMBODIMENTS

The following describes embodiments of the present invention, with reference to the drawings. The present invention is not limited to the following embodiments, and is to be understood to include the following embodiments, to which modifications and improvements are added as needed based on the ordinary knowledge of a person skilled in the art without departing from the scope of the present invention.

Figure 1:
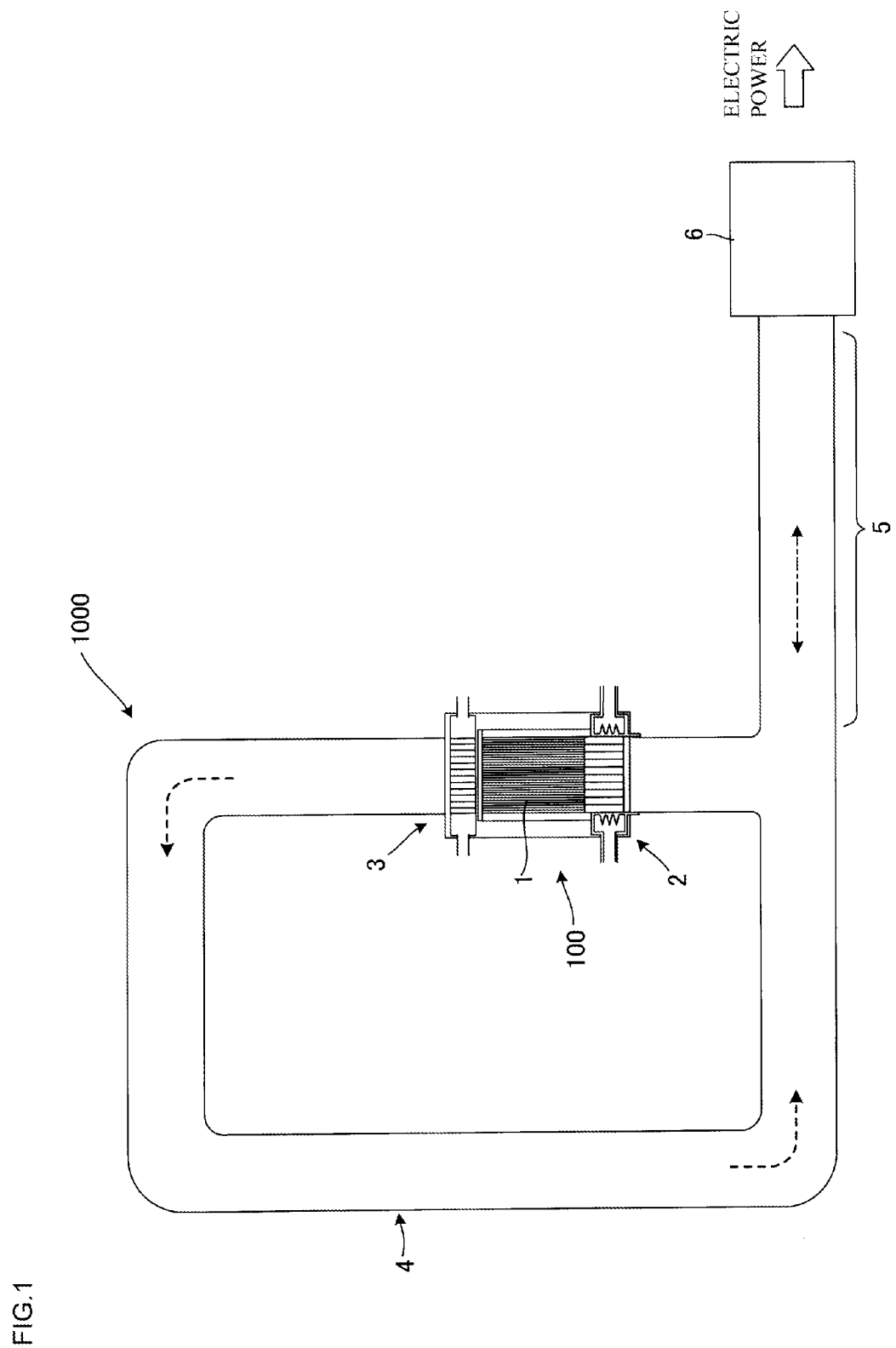
FIG. 1 schematically shows the configuration of a power generation system, to which one embodiment of a heat/acoustic wave conversion unit and a heat/acoustic wave conversion component of the present invention is applied.

FIG. 1 schematically shows the configuration of a power generation system, to which one embodiment of a heat/acoustic wave conversion unit and a heat/acoustic wave conversion component of the present invention is applied.

A power generation system 1000 in FIG. 1 includes a heat/acoustic wave conversion unit 100, a looped tube 4, a resonant tube 5 and an energy converter 6.

The looped tube 4 is a loop-shaped tube that is connected to an end on the upper side (upper end) and an end on the lower side (lower end) in the drawing of the heat/acoustic wave conversion unit 100. The resonant tube 5 is a straight tube, having one end connected to the looped tube 4 and the other end connected to the energy converter 6. Herein the resonant tube 5 and the energy converter 6 as a whole makes up a tube that is substantially closed in the end on the right side (although not shown, it exists inside of the energy converter 6 in the drawing) of the drawing.

The heat/acoustic wave conversion unit 100 includes a heat/acoustic wave conversion component 1, a high-temperature side heat exchanger 2 and a low-temperature side heat exchanger 3.

The high-temperature side heat exchanger 2 receives the inflow of heated fluid at high temperatures (e.g., high-temperature exhaust gas), and transmits the heat thereof to the lower end of the heat/acoustic wave conversion component 1 of FIG. 1 to let the heated fluid having a temperature lower than that at the time of inflow flow out. On the other hand, the low-temperature side heat exchanger 3 receives the inflow of cooled fluid (e.g., water) at relatively low temperatures compared with the heated fluid flowing in the high-temperature side heat exchanger 2 and transmits the cold heat to the upper end of the heat/acoustic wave conversion component 1 of FIG. 1 to let the cooled fluid having a temperature higher than that at the inflow flow out. Such functions of the high-temperature side heat exchanger 2 and the low-temperature side heat exchanger 3 yield the state where the lower end of the heat/acoustic wave conversion component 1 has a relatively higher temperature than at the upper end. The heat/acoustic wave conversion component 1 has a honeycomb structure including a plurality of through holes (hereinafter called cells) like thin tubes that are elongated vertically in the drawing. Each cell is partitioned from the neighboring cells by a partition wall, and is in communication with the looped tube 4 via the high-temperature side heat exchanger 2 and the low-temperature side heat exchanger 3.

Herein the looped tube 4, the resonant tube 5 and each cell of the heat/acoustic wave conversion component 1 are internally filled with working fluid that generates oscillations of longitudinal waves and transmits acoustic waves. An example of the working fluid includes gas having low viscosity and being less reactive, such as rare gas.

In such a heat/acoustic wave conversion component 1, when there is a temperature difference as stated above at the both ends, the working fluid in each cell starts to oscillate in the penetrating direction of the cells. Then the oscillations are transmitted as acoustic waves externally from the heat/acoustic wave conversion component 1. Such a phenomenon of the working fluid oscillating in response to the given temperature difference is called self-induced oscillations, and is a conventionally well-known phenomenon that occurs when a temperature gradient is given to a thin tube. A thermoacoustic effect refers to generation of acoustic waves due to the self-induced oscillation of working fluid resulting from heat. The following briefly describes this self-induced oscillation (a lot of documents describe the details, and Patent Document 3 also provides the detailed descriptions thereon, for example).

When giving a temperature gradient to a thin tube, then working fluid inside of the thin tube on the high-temperature side absorbs heat from the wall surface of the tube and expands from the high-temperature side to the low-temperature side. Then, the working fluid releases heat to the wall surface on the low-temperature side and is compressed, and then returns back to the high-temperature side. Such exchange of heat with the wall surface and expansion/compression are repeated, which results in oscillation of the working fluid in the elongation direction of the tube. Simply speaking, such motion of the working fluid can said to be the motion to convey heat so as to alleviate (weaken) the temperature gradient at the wall surface. As can be clear from this description as well, such a phenomenon occurs only when the tube is so thin that the thermal effects from the wall surface are large on the working fluid inside. That is, as the tube is made thicker, the thermal effect from the wall surface decreases (i.e., it becomes closer to an adiabatic state), and so such self-induced oscillation hardly occurs. Then, the thickness of the tube is an important factor to generate acoustic waves by the self-induced oscillation, and the thickness of the tube can be evaluated more quantitatively based on a hydraulic diameter HD that is defined as HD=4×S/C, where S denotes the cross-sectional area of the tube and C denotes the perimeter of this section.

Referring back to FIG. 1, the power generation system 1000 is described below again.

Since the heat/acoustic wave conversion component 1 includes a plurality of cells like thin tubes and the self-induced oscillation occurs in each cell, acoustic waves as the collection of oscillations of the working fluid in these plurality of cells are then issued from the heat/acoustic wave conversion component 1 to the looped tube 4. Then such acoustic waves are transmitted through the looped tube 4 in the direction of the dotted arrows in the drawing. Most of the acoustic waves transmitted through the looped tube 4 travels in the resonant tube 5 to the right in the drawing. As described above, the resonant tube 5 and the energy converter 6 as a whole makes up a tube that is substantially closed in the end on the right side of the drawing, and so some of the acoustic waves are reflected and travel to the left in the opposite direction in the drawing. Then, both of these traveling waves are overlapped in the resonant tube 5. At this time, if the frequency of the traveling waves matches with the resonant frequency that is determined, for example, by the length of the resonant tube 5 then so-called resonance occurs in the resonant tube 5, and steady waves are generated, which are overlapped waves of both of these traveling waves and have the resonant frequency. In the drawing, the double-headed arrow in the dashed-dotted line indicates the presence of the steady waves.

Herein the energy converter 6 is equipped with a mechanism not shown that is capable of changing the effective length of the resonant tube 5, which can adjust the resonance frequency so as to cause the resonance. An exemplary mechanism to change the effective length of the resonant tube 5 includes one described in Patent Document 1, for example. Although the following describes the case where the effective length of the resonant tube 5 can be changed, in the power generation system 1000 of FIG. 1, a dominant frequency component of the frequency components of acoustic waves generated at the heat/acoustic wave conversion component 1 and traveling through the looped tube 4 may be determined beforehand, and the length of the resonant tube 5 may be configured beforehand to be a special length which makes the frequency of the dominant frequency component the resonance frequency.

The energy converter 6 is equipped with a mechanism to convert acoustic waves into electrical signals as well. An exemplary conversion mechanism of such a type includes a mechanism equipped with a microphone as described in Patent Document 1. Although the conversion mechanism including a microphone is the simplest one, the conversion mechanism is not limited to such a mechanism including a microphone. For instance, conventionally known various mechanisms (e.g., the mechanism of Patent Document 2), which is to convert acoustic-wave energy to mechanical energy and then convert such mechanical energy to electric power by electromagnetic induction, can be used.

With the configuration as stated above, the power generation system 1000 of FIG. 1 can convert heat of high-temperature heated fluid (e.g., high-temperature exhaust gas) flowing into the high-temperature side heat exchanger 2 into electric power, and so enables effective use (recycling) of energy.

Next the following describes a cold heat generation system, to which the heat/acoustic wave conversion unit 100 and the heat/acoustic wave conversion component 1 as stated above are applied.

Figure 2:
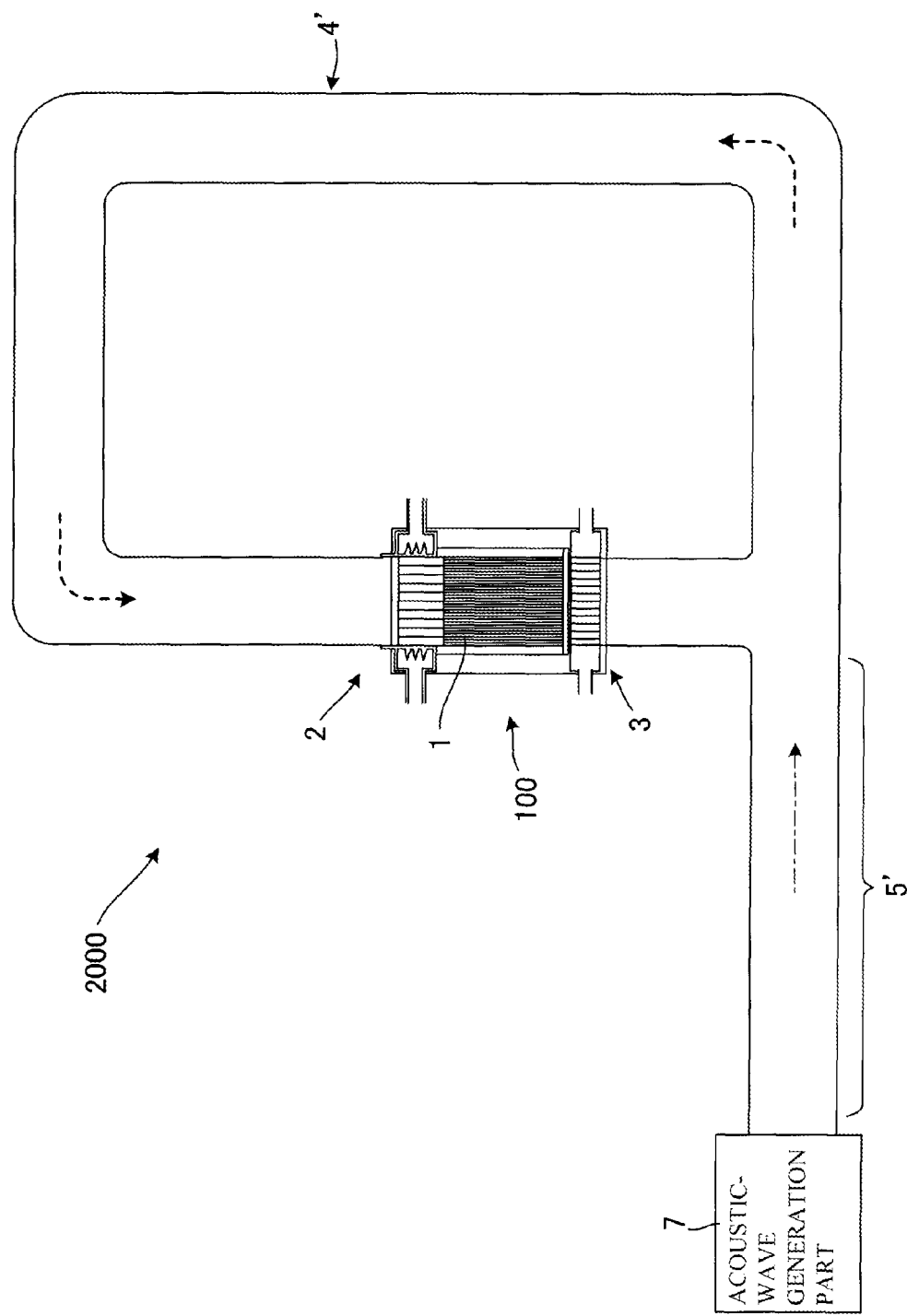
FIG. 2 schematically shows a cold heat generation system, to which the heat/acoustic wave conversion unit and the heat/acoustic wave conversion component in FIG. 1 are applied.

FIG. 2 schematically shows a cold heat generation system, to which the heat/acoustic wave conversion unit 100 and the heat/acoustic wave conversion component 1 in FIG. 1 are applied.

A cold heat generation system 2000 in FIG. 2 includes a looped tube 4', a transmission tube 5', an acoustic-wave generation part 7, and the heat/acoustic wave conversion unit 100 described referring to FIG. 1.

The looped tube 4' is a loop-shaped tube that is connected to an end on the upper side (upper end) and an end on the lower side (lower end) of the heat/acoustic wave conversion unit 100 in FIG. 2, and is in communication with the plurality of cells of the heat/acoustic wave conversion component 1 via the high-temperature side heat exchanger 2 and the low-temperature side heat exchanger 3. The transmission tube 5' is a straight tube, having one end connected to the looped tube 4' and the other end connected to the acoustic-wave generation part 7. The acoustic-wave generation part 7 has a function of generating acoustic waves, and an example of the acoustic-wave generation part 7 includes a speaker that receives electric power and outputs acoustic waves. Another example is a system that is obtained by removing the energy converter 6 from the power generation system 1000 in FIG. 1 and that receives heat and generates acoustic waves (in this case, the resonant tube 5 on the right side is an open end where no reflections occur, and so unlike the state of FIG. 1, traveling waves toward right are transmitted in the resonant tube 5).

Although the heat/acoustic wave conversion unit 100 has the same configuration as that described with reference to FIG. 1, it is configured so that, unlike FIG. 1, cooled fluid (e.g., water), which is similar to the cooled fluid flowing into the low-temperature side heat exchanger 3 in FIG. 1, flows into both of the high-temperature side heat exchanger 2 and the low-temperature side heat exchanger 3 of FIG. 2.

Herein the looped tube 4', the transmission tube 5' and each cell of the heat/acoustic wave conversion component 1 are internally filled with working fluid that generates oscillations of longitudinal waves and transmits acoustic waves. Working fluid similar to that used in the power generation system 1000 of FIG. 1 can be used.

Acoustic waves generated at the acoustic-wave generation part 7 are transmitted through the transmission tube 5' in the direction of the dashed-dotted arrow in FIG. 2, and then are transmitted through the looped tube 4' in the direction of the dashed line arrow in FIG. 2. Then, the acoustic waves reach the heat/acoustic wave conversion unit 100, and travel in each cell from the upper side in FIG. 2 of the heat/acoustic wave conversion component 1. At this time, due to heat transport by acoustic waves, the system can have a state where the end on the high-temperature side heat exchanger 2 side has a relatively higher in temperature than the end on the low-temperature side heat exchanger 3 side. At the high-temperature side heat exchanger 2, cooled fluid close to the ambient temperature flows in, and the fluid at a temperature higher than the ambient temperature flows out. On the other hand, since heat is transported to the end on the high-temperature side heat exchanger 2 side due to heat transport by acoustic waves, the end of the heat/acoustic wave conversion component 1 on the low-temperature side heat exchanger 3 side has a temperature lower than the ambient temperature. Then at the low-temperature side heat exchanger 3, cooled fluid close to the ambient temperature flows in, and the fluid at a temperature lower than the ambient temperature flows out because heat is taken by the end of the heat/acoustic wave conversion component 1 on the low-temperature side heat exchanger 3 side. In other words, cold heat is output in the form of cold water.

With the configuration as stated above, the cold heat generation system 2000 in FIG. 2 can output cold heat using acoustic-wave energy generated at the acoustic-wave generation part 7. Especially when it includes, as the acoustic-wave generation part 7, the system corresponding to the power generation system 1000 of FIG. 1 other than the energy converter 6, high-temperature heated fluid (e.g., high-temperature exhaust gas) flowing into the high-temperature side heat exchanger 2 of FIG. 1 can be converted into cold heat, which then enables effective use (recycling) of energy.

As stated above, in the power generation system 1000 in FIG. 1 and the cold heat generation system 2000 in FIG. 2, the heat/acoustic wave conversion unit 100 that is one embodiment of the present invention plays a very important role. Then the following describes the heat/acoustic wave conversion unit 100 in more details, by way of an exemplary situation where that is used in the power generation system 1000 of FIG. 1. The following describes the power generation system 1000 of FIG. 1, by way of an example where high-temperature heated fluid (e.g., exhaust gas itself) at about 400 to 600° C. that are typical temperatures of the exhaust gas from automobiles flows in the high-temperature side heat exchanger 2 of FIG. 1, and low-temperature cooled fluid (e.g., water) at about 20 to 70° C. flows into the low-temperature side heat exchanger 3. In this case, a temperature difference between both ends of the heat/acoustic wave conversion component 1 is about 330 to 580° C.

Naturally the properties of the heat/acoustic wave conversion unit 100 described below are the same as in the case where it is used in the cold heat generation system 2000 of FIG. 2 as well.

Figure 3:
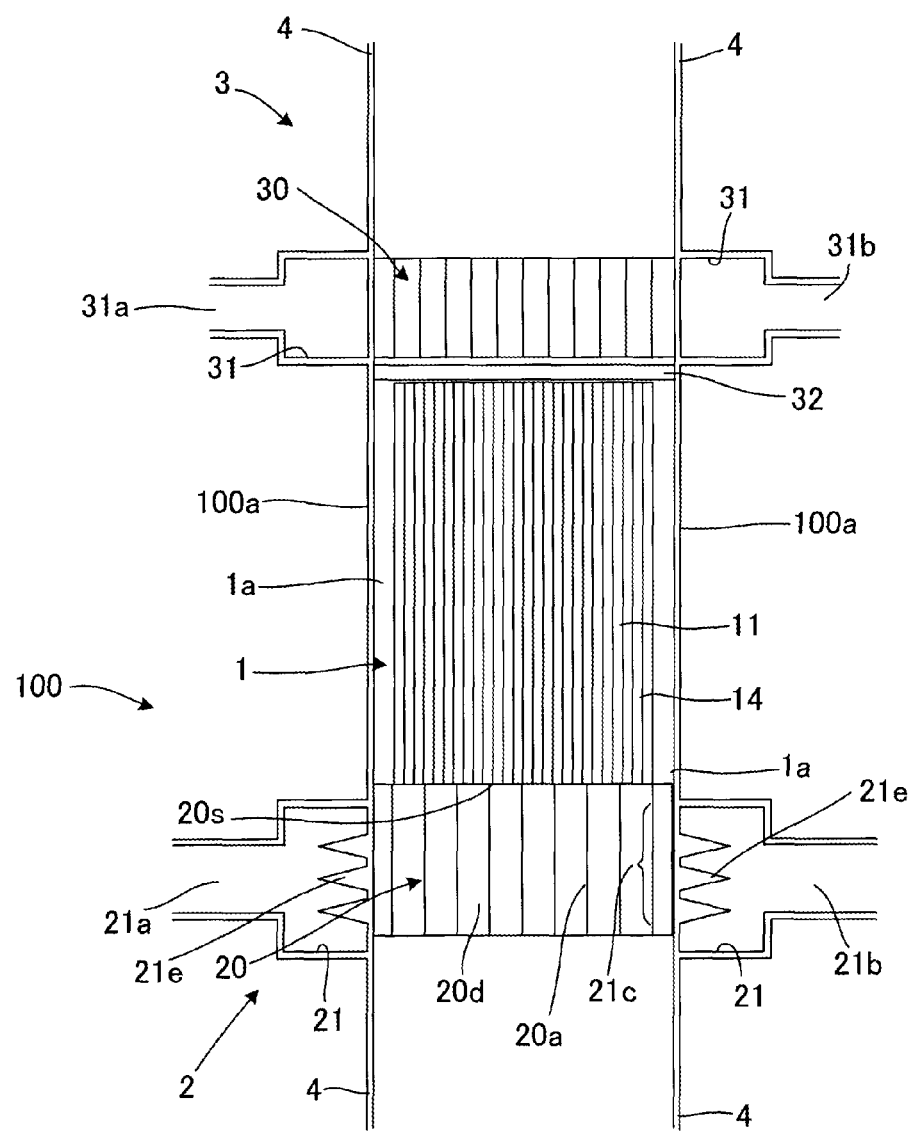
FIG. 3 schematically shows the configuration of the heat/acoustic wave conversion unit of FIG. 1.

FIG. 3 schematically shows the configuration of the heat/acoustic wave conversion unit 100 of FIG. 1.

The heat/acoustic wave conversion unit 100 includes a heat/acoustic wave conversion component 1, a high-temperature side heat exchanger 2 and a low-temperature side heat exchanger 3 as well as a metal member 32 and an interference member 1a. These components as a whole are stored in a housing 100a and are connected to a looped tube 4 (see FIG. 1 also).

The heat/acoustic wave conversion component 1 has a honeycomb structure in which a plurality of cells 14, each being a thin-tube like through hole, are partitioned and defined by a partition wall 11. Herein, the word "cell" in the present specification refers to a through hole only that does not include the partition wall. Each cell 14 has a penetrating direction (an extending direction in which each cell 14 extends) that is the vertical direction of FIG. 3, and is open at both end faces of an end face on the low-temperature side heat exchanger 3 side and an end face of the high-temperature side heat exchanger 2 side. The end face of the heat/acoustic wave conversion component 1 on the low-temperature side heat exchanger 3 side is in contact with the metal member 32, and is opposed to the low-temperature side heat exchanger 3 with the metal member 32 disposed therebetween. Although the metal member 32 is disposed in this case, the present invention may have a form without the metal member 32. When the metal member 32 is omitted, working fluid in contact with a mesh lamination body 30 described later is cooled, and then the cooled working fluid comes into contact with the vicinity of the end face of the heat/acoustic wave conversion component 1 due to the displacement of the working fluid, which corresponds to oscillations of acoustic waves, and cools the vicinity of the end face. When the metal member 32 is omitted, a gap between the heat/acoustic wave conversion component 1 and the low-temperature side heat exchanger 3 is as small as possible preferably.

The metal member 32 is a metal member having a plate shape, at a center part of which a plurality of parallel slits (not shown) are formed, and FIG. 3 shows only a side-face part (thickness part) of the plate shape.

The low-temperature side heat exchanger 3 includes the mesh lamination body 30 including a plurality of metal mesh plates (e.g., made of copper). The low-temperature side heat exchanger 3 includes a low-temperature side annular tube 31 also that is an annular tube surrounding the side face of the mesh lamination body 30. FIG. 3 schematically shows the state where such a low-temperature side annular tube 31 surrounding the side face of the mesh lamination body 30 sandwiches the mesh lamination body 30 from both sides at a cross-section including an inflow port 31a and an outflow port 31b. This low-temperature side annular tube 31 has a function of receiving, from the inflow port 31a, the inflow of cooled fluid (e.g., water) that is at a relatively low temperature with reference to the heated fluid flowing into the high-temperature side heat exchanger 2 described later, and transmitting cold heat of the cooled fluid to the mesh lamination body 30 (in other words, transmits heat at the mesh lamination body 30 to the cooled fluid) and letting cooled fluid with an increased temperature flow out from the outflow port 31b.

Cold heat transmitted to the mesh lamination body 30 is transmitted to the working fluid in contact therewith, and is then transmitted to the end face of the heat/acoustic wave conversion component 1 on the low-temperature side heat exchanger 3 side due to displacement of acoustic waves to cool the end of the heat/acoustic wave conversion component 1 on the low-temperature side heat exchanger 3 side. To this end, the metal member 32 is preferably made of a material having large heat conductivity, which may be made of e.g., copper.

That is the detailed description of the configuration of the low-temperature side heat exchanger 3, and the heat/acoustic wave conversion unit of the present invention is not limited especially about the details of the low-temperature side heat exchanger, and a conventionally known heat exchanger may be used. The same configuration as that of the high-temperature side heat exchanger 2 described later may be used.

The side face of the heat/acoustic wave conversion component 1 is surrounded by the interference member 1a, and FIG. 3 schematically shows the cross section of the surrounding interference member 1a as two parts that sandwich the heat/acoustic wave conversion component 1 from both of right and left sides in the drawing. This interference member 1a has a function as a thermal insulator to avoid heat transmission between the ends of the heat/acoustic wave conversion component 1 on the low-temperature side heat exchanger 3 side and on the high-temperature side heat exchanger 2 side via the surrounding environment outside of the heat/acoustic wave conversion component 1.

The high-temperature side heat exchanger 2 includes a heat-exchanging honeycomb structure 20 and a high-temperature side annular tube 21. The heat-exchanging honeycomb structure 20 has a honeycomb structure similarly to the heat/acoustic wave conversion component 1, including two or more cells 20d, each being a thin-tube like through hole penetrating vertically in FIG. 3, that are partitioned and defined by a partition wall 20a. The high-temperature side annular tube 21 is an annular tube surrounding the side face of the heat-exchanging honeycomb structure 20, and has a function of receiving, from an inflow port 21a, the inflow of high-temperature heated fluid (e.g., high-temperature exhaust gas), transmitting heat of the heated fluid to the heat-exchanging honeycomb structure 20 and letting heated fluid with a decreased temperature flow out from an outflow port 21b. Then as shown in FIG. 3, the high-temperature side annular tube 21 internally includes a metal or ceramic fin 21e containing SiC (silicon carbide) as a main component to increase the contact area with the heated fluid.

Figure 4:
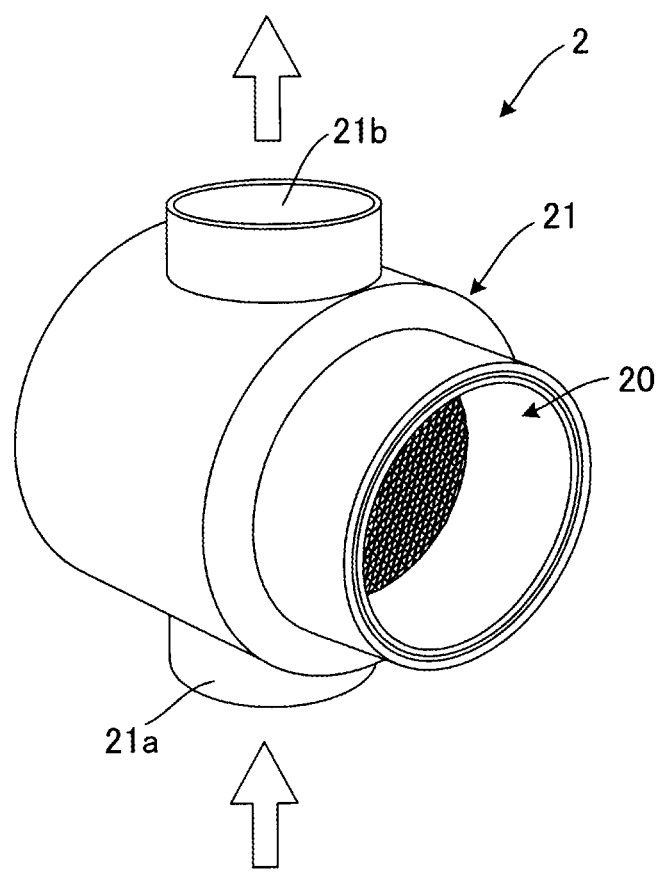
FIG. 4 is a perspective view showing the appearance of the high-temperature side heat exchanger in the heat/acoustic wave conversion unit of FIG. 3.
Figure 5:
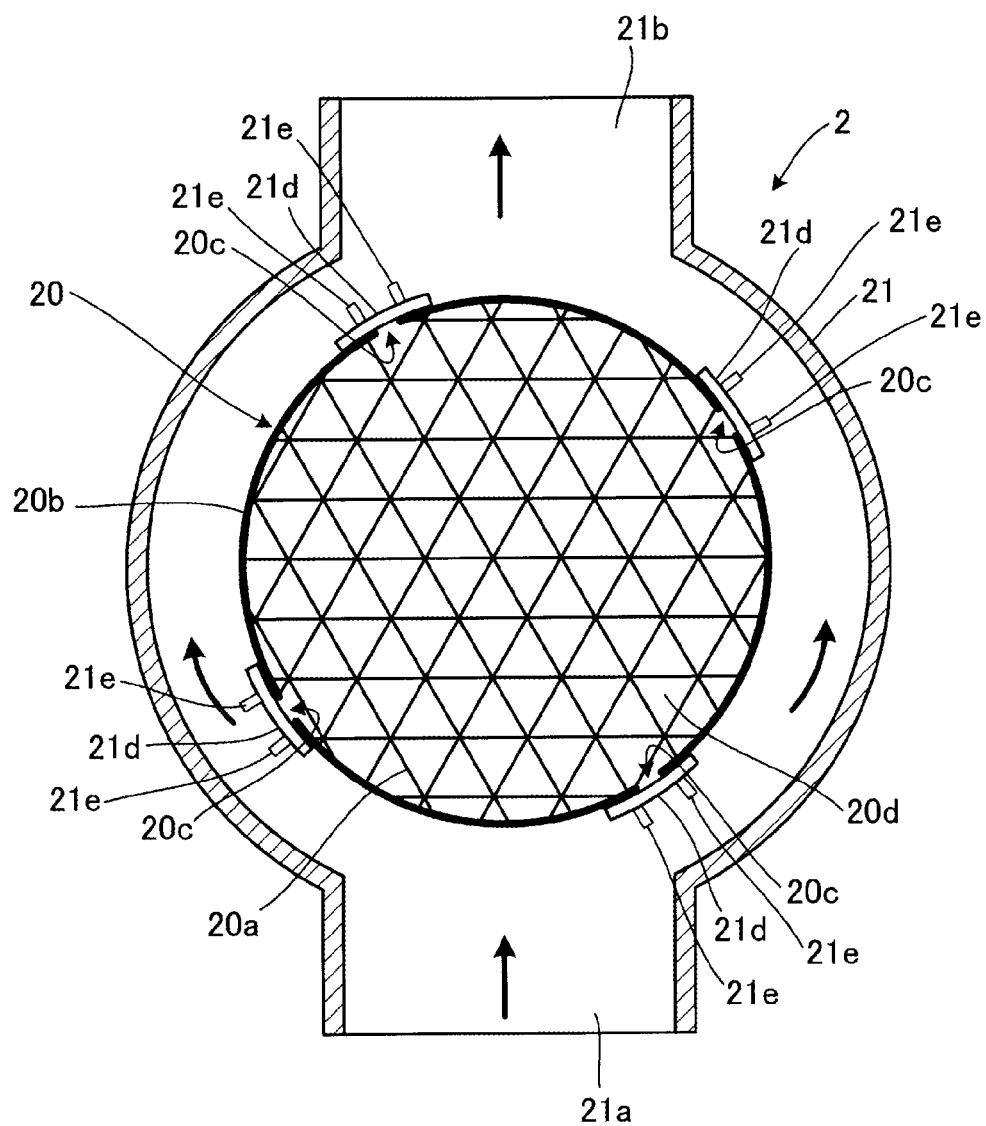
FIG. 5 is a cross-sectional view of the high-temperature side heat exchanger when viewing an inflow port and an outflow port of the high-temperature side annular tube in a plane.

FIG. 4 is a perspective view showing the appearance of the high-temperature side heat exchanger 2 in the heat/acoustic wave conversion unit 100 of FIG. 3, and FIG. 5 is a cross-sectional view of the high-temperature side heat exchanger 2, which is a plan view including the inflow port 21a and the outflow port 21b of the high-temperature side annular tube 21.

As shown in FIG. 4, the high-temperature side heat exchanger 2 includes the heat-exchanging honeycomb structure 20 that is fitted in a center hollow part of the annular shape of the high-temperature side annular tube 21. As indicated with thick arrows in FIG. 4, high-temperature heated fluid (e.g., high-temperature exhaust gas) flows into the high-temperature side annular tube 21 from the inflow port 21a on the lower side of the drawing and flows out from the outflow port 21b on the upper side of the drawing. At this time, as indicated with the arrows in FIG. 5, the high-temperature heated fluid flowing in through the inflow port 21a directly hits a circumferential wall 20b defining the circular circumference of the heat-exchanging honeycomb structure 20 and then is branched off into left and right two sides of the circumferential wall 20b and travels along the circumferential wall 20b. Then they join together at the outflow port 21b to flow out. In this way, the high-temperature heated fluid directly comes into contact with the circumferential wall 20b of the heat-exchanging honeycomb structure 20, whereby a lot of heat is directly transmitted from the high-temperature heated fluid to the circumferential wall 20b, and such heat is transmitted to the partition wall 20a in the heat-exchanging honeycomb structure 20 and the working fluid inside of the cells 20d as well. In this way, the heat-exchanging honeycomb structure 20 can directly come into contact with the high-temperature heated fluid because the heat-exchanging honeycomb structure 20 is made of a material having high heat resistance and good heat conductivity as described later, and such a direct contact with the heated fluid can suppress heat loss and improve heat-exchanging efficiency as compared with the case including another member intervening therebetween.

Although it is preferable that the heat-exchanging honeycomb structure 20 directly comes into contact with heated fluid in this way, the present invention may have a form in which, instead of such a direct contact of the circumferential wall 20b of the heat-exchanging honeycomb structure 20 with high-temperature heated fluid, the circumferential wall 20b is surrounded with metal. Especially when high-pressure gas (e.g., inert rare gas such as argon) is used as the working fluid to transmit acoustic waves, it is preferable to surround the circumferential wall 20b with metal from the viewpoint of hermetically sealing of such high-pressure gas and avoiding the leakage. In this case, the metal surrounding the circumferential wall 20b has a circumferential face, on which a metal fin (see fin 21e in FIG. 3, for example) is preferably provided so as to protrude in the outward direction (radial direction) from the center of the heat-exchanging honeycomb structure 20 of FIG. 5. This is to increase the contact area with the high-temperature heated fluid and improve heat-exchanging efficiency. If the contact area with the high-temperature heated fluid is small, exchange of heat between the high-temperature heated fluid and the high-temperature side heat exchanger 2 is not sufficient, and so the heat-exchanging efficiency of the high-temperature side heat exchanger 2 deteriorates. In this way, it is important for the high-temperature side heat exchanger 2 to maximize the contact area with the high-temperature heated fluid.

In a most preferable form, another honeycomb structure made of a ceramic material containing SiC (silicon carbide) as a main component is fitted in the tube of the high-temperature side annular tube. This is because such a ceramic material containing SiC (silicon carbide) as a main component has higher heat conductivity at high temperatures than that of metal fins, and the contact area with high-temperature gas also can be increased dramatically. Further, this can avoid a problem of erosion and deterioration due to high-temperature heated fluid, which can be a problem for metal fins. The following describes such a preferable form.

Figure 6:
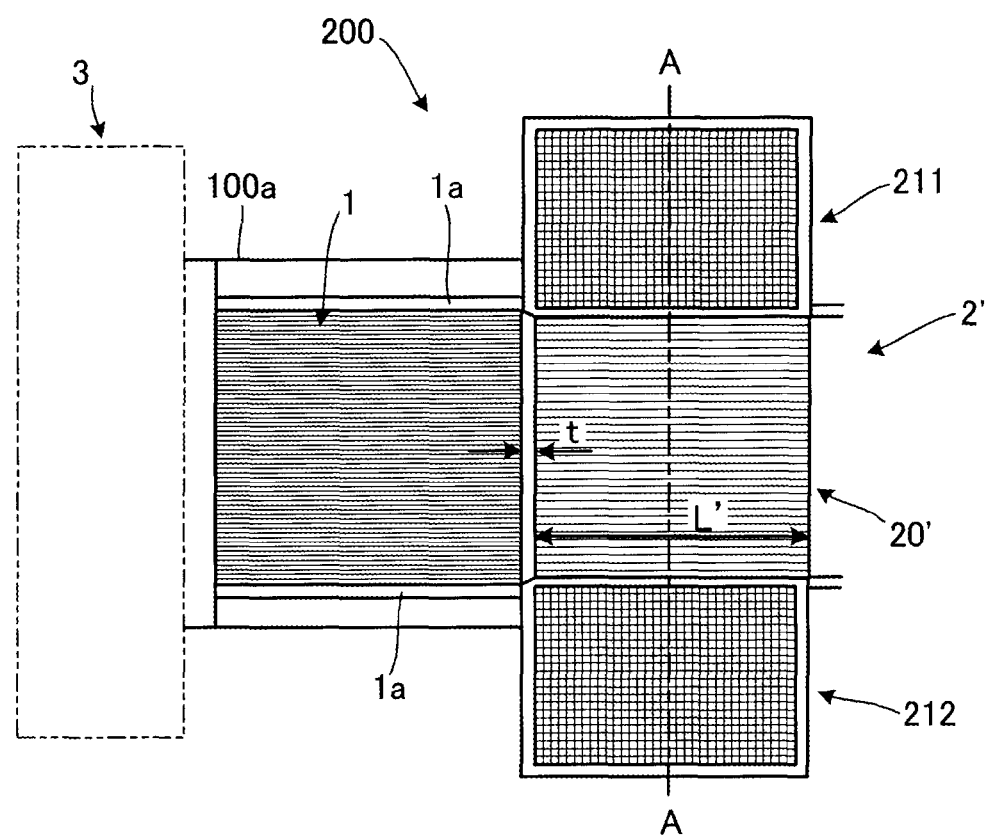
FIG. 6 schematically shows one form of a heat/acoustic wave conversion unit including another honeycomb structure fitted in the high-temperature side annular tube.
Figure 7:
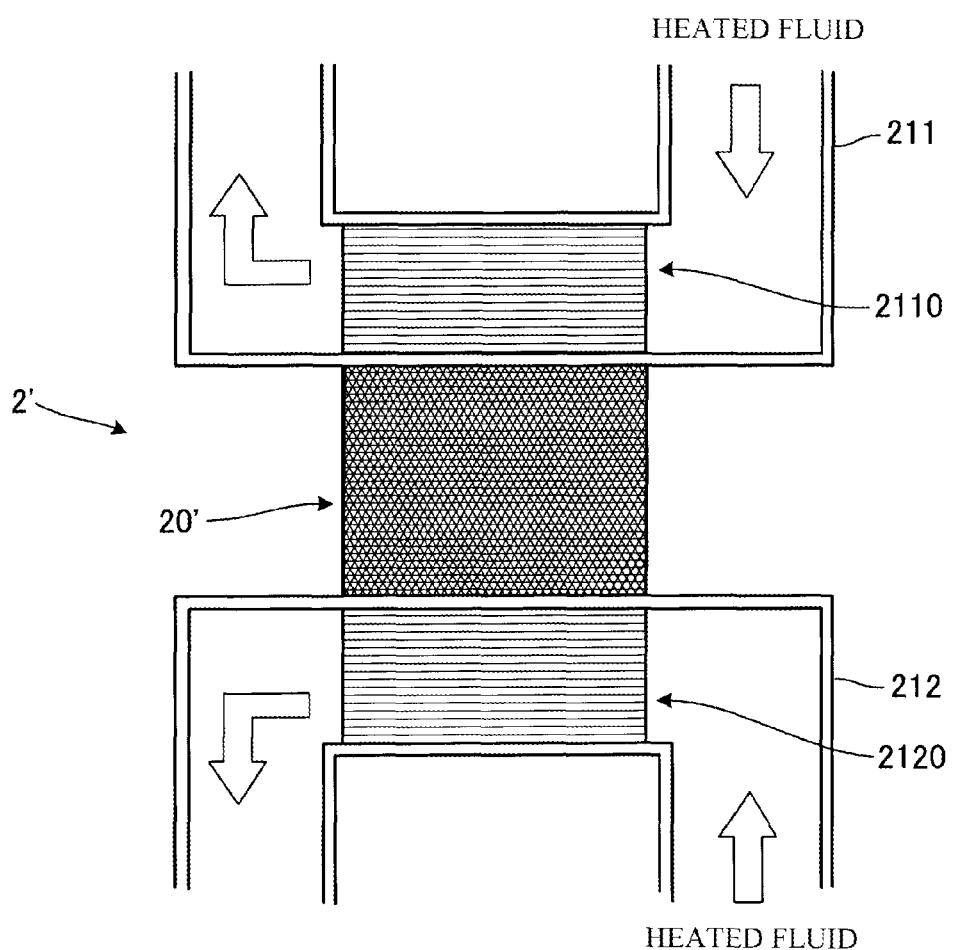
FIG. 7 is a schematic cross-sectional view of the high-temperature side heat exchanger taken along the line A-A of FIG. 6.

FIG. 6 schematically shows one form of a heat/acoustic wave conversion unit including another honeycomb structure fitted in the high-temperature side annular tube. FIG. 7 is a schematic cross-sectional view of the high-temperature side heat exchanger taken along the line A-A of FIG. 6.

In FIGS. 6 and 7, the same reference numerals are assigned to the same elements as those in FIGS. 3 to 5, and their duplicated descriptions are omitted.

A high-temperature side heat exchanger 2' in a heat/acoustic wave conversion unit 200 in FIG. 6 includes a heat-exchanging honeycomb structure 20' and two mutually different high-temperature side annular tubes 211 and 212. The heat-exchanging honeycomb structure 20' has a honeycomb structure including two or more cells penetrating horizontally in the drawing that are partitioned and defined by a partition wall, and transmits heat transmitted from heated fluid via the two different high-temperature side annular tubes 211 and 212 to the heat/acoustic wave conversion component 1. Herein, the heat-exchanging honeycomb structure 20' is disposed with a distance t from the heat/acoustic wave conversion component 1.

As shown in FIG. 7, the two high-temperature side annular tubes 211 and 212 internally include in-tube honeycomb structures 2110 and 2120, respectively, made of a ceramic material containing SiC (silicon carbide) as a main component. These in-tube honeycomb structures 2110 and 2120 both have a honeycomb structure including two or more cells penetrating horizontally in the drawing that are partitioned and defined by a partition wall. As shown in the arrows of the drawing, heated fluid flowing in the two high-temperature side annular tubes 211 and 212 passes through each cell of the in-tube honeycomb structures 2110 and 2120, and then flows out. At this time, heat of the heated fluid passing through each cell is transmitted to the in-tube honeycomb structures 2110 and 2120, and such heat is then transmitted to the heat-exchanging honeycomb structure 20' via the wall faces of the high-temperature side annular tubes 211, 212 and a metal tube (not shown) surrounding the side face (face of the circumferential wall) of the heat-exchanging honeycomb structure 20'. Although FIG. 7 shows the cross-section of the heat-exchanging honeycomb structure 20' as a rectangular shape for simplicity, it may have a circular cross section as in FIGS. 4 and 5, and a substantially similar configuration can be realized when the high-temperature side annular tubes 211 and 212 have a shape along the circle.

In this way, the circumferential wall of the heat-exchanging honeycomb structure 20' is surrounded with a metal tube, on an outside of which the two in-tube honeycomb structures 2110 and 2120 made of a ceramic material containing SiC (silicon carbide) as a main component are disposed. In this configuration, the heat-exchanging honeycomb structure 20' is not in a direct contact with the heated fluid, and so erosion and deterioration due to high-temperature heated fluid can be suppressed. When inert rare gas (e.g., argon) is used as the working fluid, a problem of erosion of the heat-exchanging honeycomb structure 20' due to working fluid does not happen. In this case, the heat-exchanging honeycomb structure 20' may be made of a metal material having good heat conductivity, such as copper, as well as a ceramic material containing SiC (silicon carbide) as a main component.

Herein, the heat-exchanging honeycomb structure 20' in FIG. 6 preferably has a length L' of the order of wavelength of acoustic waves generated from oscillations of the working fluid. If the length L' is too long with reference to the wavelength of acoustic waves, the heat given to the working fluid (e.g., inert rare gas) will be insufficient. If the length L' is too short with reference to the wavelength of acoustic waves, then working fluid may pass through the heat-exchanging honeycomb structure 20' from the outside and reach the heat/acoustic wave conversion component 1, and the working fluid at a relatively low temperature may cool the end of the heat/acoustic wave conversion component 1 on the high-temperature side heat exchanger side unfortunately.

Figure 8:
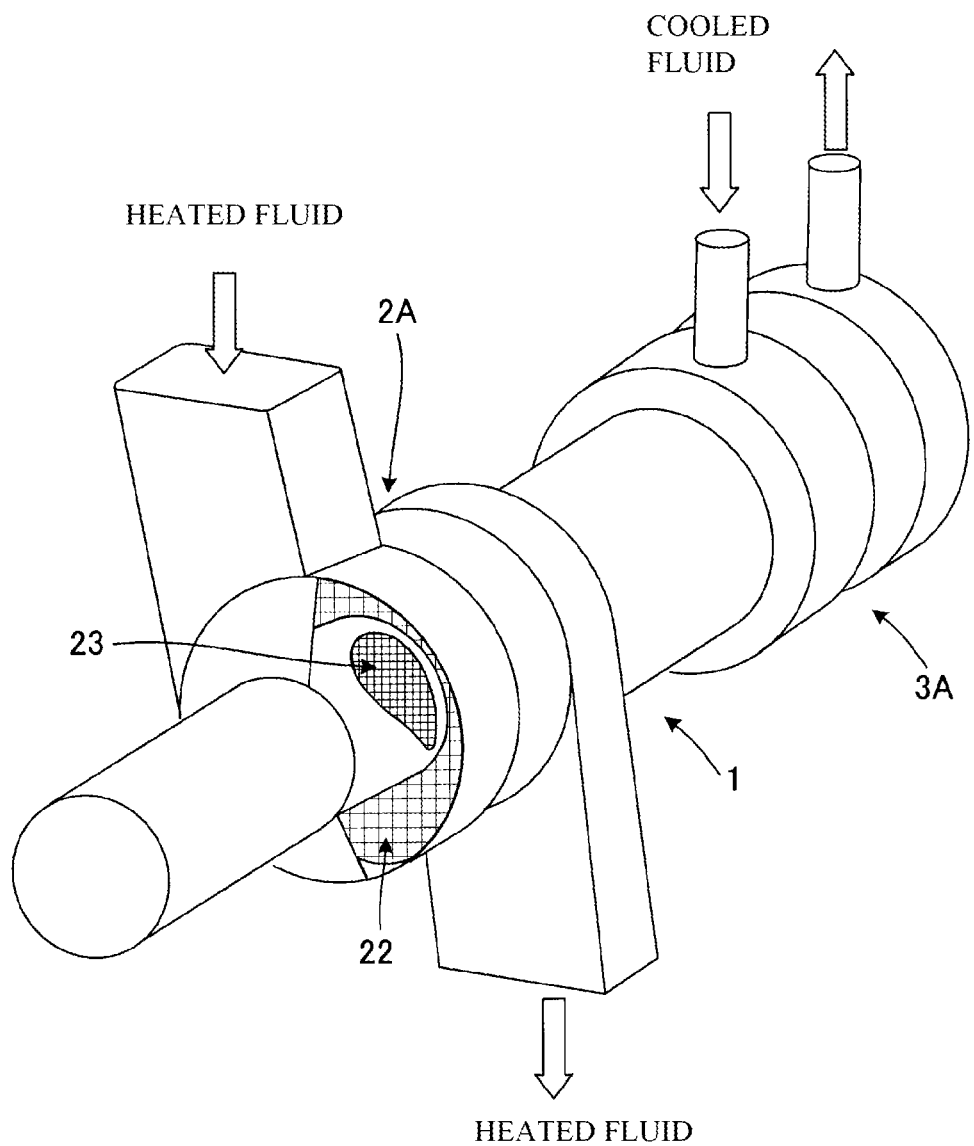
FIG. 8 schematically shows another form of the heat/acoustic wave conversion unit of the present invention that is different from the heat/acoustic wave conversion units in FIGS. 6 and 7.
Figure 9:
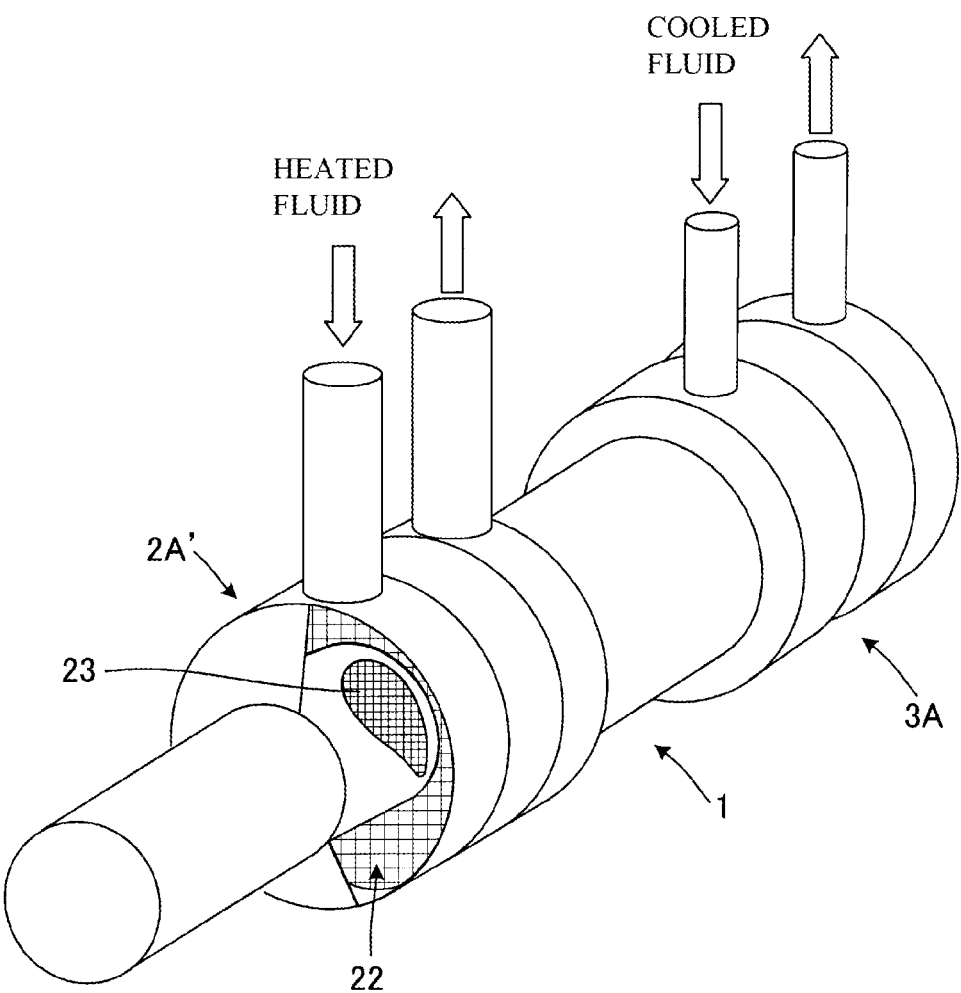
FIG. 9 schematically shows still another form of the heat/acoustic wave conversion unit that is different from the heat/acoustic wave conversion unit in FIG. 8.

FIG. 8 schematically shows another form of the heat/acoustic wave conversion unit of the present invention that is different from the heat/acoustic wave conversion units in FIGS. 6 and 7, and FIG. 9 schematically shows still another form of the heat/acoustic wave conversion unit that is different from the heat/acoustic wave conversion unit in FIG. 8.

In the heat/acoustic wave conversion unit of FIG. 8, heated fluid flows into the high-temperature side heat exchanger 2A from the upper side of the drawing and flows through the high-temperature side heat exchanger 2A, and then flows out toward the lower side of the drawing. On the other hand, in the heat/acoustic wave conversion unit of FIG. 9, heated fluid flows into the high-temperature side heat exchanger 2A' from the upper side of the drawing and flows through the high-temperature side heat exchanger 2A', and then flows out toward the upper side of the drawing. Herein in both of the heat/acoustic wave conversion units of FIGS. 8 and 9, cooled fluid flows into the low-temperature side heat exchanger 3A from the upper side of the drawing and flows through the low-temperature side heat exchanger 3A, and then flows out toward the upper side of the drawing. FIGS. 8 and 9 show the configuration partially as a perspective view to clarify the internal configurations (configuration including the following two honeycomb structures 22, 23).

The high-temperature side heat exchanger 2A in FIG. 8 and the high-temperature side heat exchanger 2A' in FIG. 9 include a pillar-shaped honeycomb structure 23 made of a metal material, and a hollow and round pillar-shaped (in other words, a cylindrical shape having a thickness) honeycomb structure 22 made of a ceramic material containing SiC (silicon carbide) as a main component surrounding the honeycomb structure. At the circumference of the honeycomb structure 23, a metal mesh outer tube 23a described later, which is made of the same metal material, is formed integrally with the metal honeycomb structure 23. To be precise, a metalized layer, which is described later, is present between the two honeycomb structures 22 and 23. These two honeycomb structures 22 and 23 both have a honeycomb structure including two or more round pillar-shaped cells penetrating in the elongated direction that are partitioned and defined by a partition wall. Such a configuration in FIGS. 8 and 9 also can suppress heat loss and improve heat conversion efficiency.

These embodiments have a honeycomb structure including the honeycomb structure 23 made of a metal material, and instead of this, a mesh structure made up of metal mesh may be used.

Figure 10:
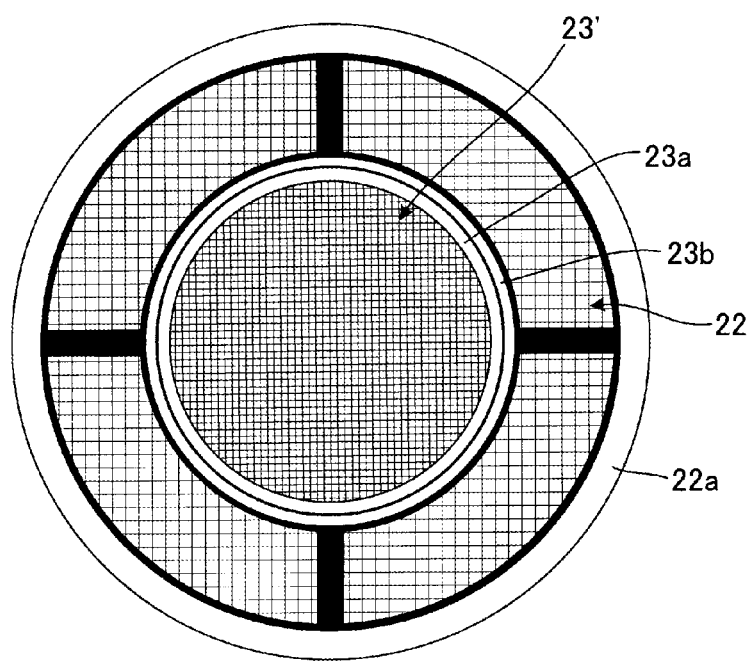
FIG. 10 is a cross-sectional view of a high-temperature side heat exchanger having a mesh structure.

FIG. 10 is a cross-sectional view of a high-temperature side heat exchanger having a mesh structure.

The high-temperature side heat exchanger in FIG. 10 includes, inside of the honeycomb structure 22 made of a ceramic material containing SiC (silicon carbide) as a main component that is surrounded with a metal outer tube 22a, a metal mesh member 23' via a cylindrical metalized layer 23b and a metal mesh outer tube 23a. Herein the metalized layer 23b is a layer formed by baking of metal such as molybdenum and manganese, which is a layer to bond the metal mesh outer tube 23a made of metal and the honeycomb structure 22 made of ceramic. The configuration in FIG. 10 also can suppress heat loss and improve heat-exchanging efficiency.

Referring back to FIGS. 3 to 5 again, the descriptions are continued in the following.

As shown in FIG. 3, the end face of the heat-exchanging honeycomb structure 20 on the heat/acoustic wave conversion component 1 side (the upper end face of the heat-exchanging honeycomb structure 20) is in a direct contact with the end face of the heat/acoustic wave conversion component 1 on the high-temperature side heat exchanger 2 side (the lower end face of the heat/acoustic wave conversion component 1). Hereinafter this upper end face of the heat-exchanging honeycomb structure 20 is called a contact face 20s. Instead of such a direct contact between the heat/acoustic wave conversion component 1 and the heat-exchanging honeycomb structure 20, gap t as in FIG. 6 may be present between the heat/acoustic wave conversion component 1 and the heat-exchanging honeycomb structure 20 in the present invention. In this case, heat transmitted to the heat-exchanging honeycomb structure 20 is transmitted to working fluid coming into contact with the heat-exchanging honeycomb structure 20, and the heated working fluid comes into contact with the vicinity of the end face of the heat/acoustic wave conversion component 1 due to displacement of the working fluid, which corresponds to oscillations of acoustic waves, to heat the vicinity of the end face. This allows the end of the heat/acoustic wave conversion component 1 on the high-temperature side heat exchanger 2 side to keep a relatively high-temperature state as compared with the end on the low-temperature side heat exchanger 3 side.

This heat-exchanging honeycomb structure 20 is made of a ceramic material containing SiC (silicon carbide) as a main component. Since a ceramic material has high heat resistance, such a material is suitable for the material of the heat-exchanging honeycomb structure 20 that directly comes into contact with high-temperature heated fluid as stated above. Further, since a ceramic material containing SiC as a main component has relatively good heat conductivity among other ceramic materials, such a material is suitable for a function to let the heat-exchanging honeycomb structure 20 transmit heat to the heat/acoustic wave conversion component 1 as stated above. Note here that "containing SiC (silicon carbide) as a main component" means that SiC accounts for 50 mass % or more of the material of the heat-exchanging honeycomb structure 20. At this time, the porosity is preferably 0 to 10%. It is then preferable that the thickness of the partition wall 20a is 0.25 to 0.51 mm and the cell density is 15 to 62 cells/cm$^2$.

Specific examples of the ceramic material containing SiC as a main component include simple SiC as well as Si impregnated SiC, (Si+Al) impregnated SiC, metal composite SiC, recrystallized SiC, $Si_3N_4$ and SiC. Among them, Si impregnated SiC and (Si+Al) impregnated SiC are preferable. This is because Si impregnated SiC has good heat conductivity and heat resistance, and has low porosity although it is a porous body and so is formed densely, and then it can realize relatively high strength as compared with SiC without impregnated Si.

As shown in FIG. 5, the heat-exchanging honeycomb structure 20 has a configuration of the triangle cells 20d that are arranged periodically with a period of a constant length in the plane perpendicular to the penetrating direction of the cells 20d. As described later, the heat/acoustic wave conversion component 1 to which heat is to be transmitted also has a similar configuration (see FIG. 11 described later), and the period of the cells 20d in the heat-exchanging honeycomb structure 20 is integral multiples of 10 or more of the period (see FIG. 11 described later) of cells 14 in the heat/acoustic wave conversion component 1. In this way, the cells 20d of the heat-exchanging honeycomb structure 20 have the same shape as that of the cells 14 of the heat/acoustic wave conversion component 1 to which heat is to be transmitted, and the period of the cells 20d of the heat-exchanging honeycomb structure 20 is integral multiples of the period of the cells 14 of the heat/acoustic wave conversion component 1, whereby working fluid contained inside the cells 20d of the heat-exchanging honeycomb structure 20 and the cells 14 of the heat/acoustic wave conversion component 1 can move smoothly. The period of the cells of the heat-exchanging honeycomb structure 20 is larger than the period of the cells of the heat/acoustic wave conversion component 1 because the cells 14 of the heat/acoustic wave conversion component 1 are required to be very thin through holes to cause self-induced oscillations as stated above. On the other hand, there is no such a request for the cells 20d of the heat-exchanging honeycomb structure 20, and the heat-exchanging honeycomb structure 20 may play a role of heat exchange simply, and so the period of them is larger than the period of the cells 14 of the heat/acoustic wave conversion component 1 by one digit (ten times) or more.

As shown in FIG. 3, the contact face 20s of the heat-exchanging honeycomb structure 20 with the heat/acoustic wave conversion component 1 is displaced toward the heat/acoustic wave conversion component 1 (upper side in the drawing) from a heat-receiving region 21c where the heat-exchanging honeycomb structure 20 directly comes into contact with high-temperature heated fluid to receive heat therefrom, and so does not overlap with the heat-receiving region 21c. If the contact face 20s overlaps with the heat-receiving region 21c, a temperature may differ greatly between the periphery of an edge of the contact face 20s closer to the heat-receiving region 21c and a center region away from the heat-receiving region 21c. In this case, the end (lower end in FIG. 3) of the heat/acoustic wave conversion component 1 on the heat-exchanging honey-comb structure 20 side is not heated uniformly, and so the cells of the heat/acoustic wave conversion component 1 cause non-uniform self-induced oscillations unfortunately. The heat-exchanging honeycomb structure 20 in FIG. 3 is configured so as not to overlap the contact face 20s with the heat-receiving region 21c to avoid such a problem.

As shown in FIG. 5, the heat-exchanging honeycomb structure 20 includes a slit 20c as a gap part of the circumferential wall 20b, the slit extending in the penetrating direction of the cells 20d. FIG. 5 shows the example of slits 20c formed at four positions of the circumferential face of the heat-exchanging honeycomb structure 20. Such slits 20c can mitigate thermal stress applied to the circumferential wall 20b when high-temperature heated fluid directly comes into contact with the circumferential wall 20b, which then can suppress breakage or peeling-off of the circumferential wall 20b and the partition wall 20a.

As shown in FIG. 5, the high-temperature side annular tube 21 is provided with four heat-resistant metal plates 21d along the extending direction of the slits 20c to fill the gaps at the slits 20c and extend. These four heat-resistance metal plates 21d can prevent working fluid from leaking into the high-temperature side annular tube 21 through the four slits 20c. Note here that the heat-exchanging honeycomb structure 20 is supported by fitting into these four heat-resistance metal plates 21d at an annular center part of the high-temperature side annular tube 21. These four heat-resistance metal plates 21d are provided with fins 21e (see FIG. 3 also) made of metal or ceramic containing SiC (silicon carbide) as a main component, the fins protruding outward (radial direction) from the center of the heat-exchanging honeycomb structure 20 in FIG. 5.

Next, the following describes the heat/acoustic wave conversion component 1 in FIG. 3 in details.

Figure 11:
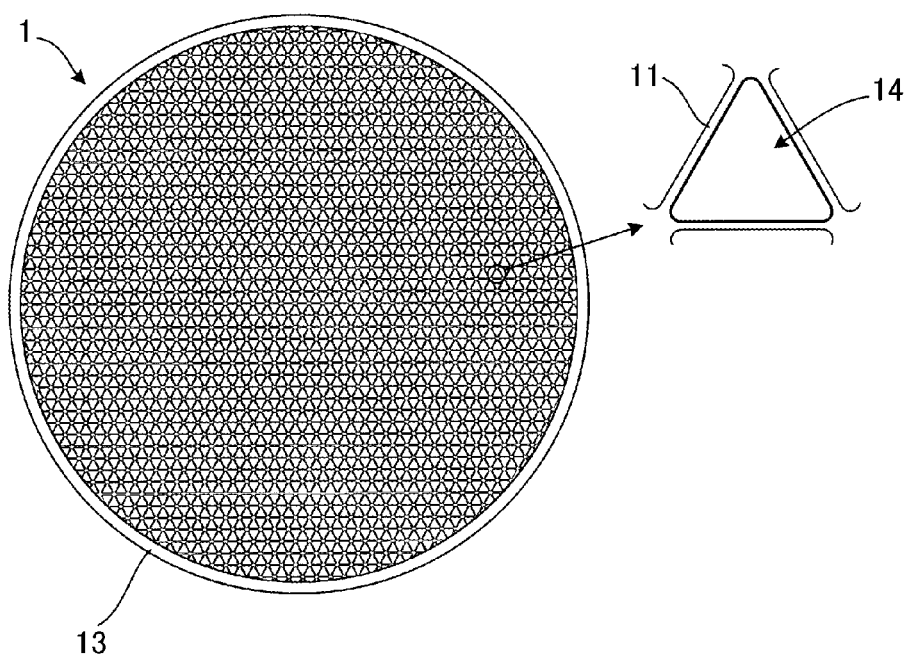
FIG. 11 is a cross-sectional view of the heat/acoustic wave conversion component of FIG. 3 in a plane perpendicular to the penetrating direction of the cells of the heat/acoustic wave conversion component.

FIG. 11 is a cross-sectional view of the heat/acoustic wave conversion component 1 in FIG. 3 in a plane perpendicular to the penetrating direction of the cells 14 of the heat/acoustic wave conversion component 1.

As shown in FIG. 11, the heat/acoustic wave conversion component 1 includes a plurality of cells 14, each being a thin-tube like through hole, that are partitioned and defined by a partition wall 11, and the partition wall 11 as a whole is then surrounded with a circumferential wall 13. The circumferential wall 13 may be made of the same material as that of the partition wall 11.

As described above, hydraulic diameter HD of the cells 14 is one of the important factors to generate acoustic waves by self-induced oscillations, and so the hydraulic diameter HD of the cells 14 in the heat/acoustic wave conversion component 1 has a very small value of 0.4 mm or less. Such cells with a very small hydraulic diameter HD can realize a sufficient thermoacoustic effect from the heat/acoustic wave conversion component 1. Conversely if the hydraulic diameter HD is larger than 0.4 mm, a very small thermoacoustic effect only can be realized, and then it becomes difficult to obtain sufficient amount of electric power and cold heat from the power generation system 1000 in FIG. 1 and the cold heat generation system 2000 in FIG. 2.

Herein for a larger thermoacoustic effect, it is advantageous to form as many as possible of the cells having a small hydraulic diameter HD as stated above. In other words, it is advantageous to have a larger open frontal area at the end faces of the heat/acoustic wave conversion component 1. The open frontal area of the heat/acoustic wave conversion component 1 at the end faces is a high open frontal area of 60% or more, whereby the heat/acoustic wave conversion component can exert a larger thermoacoustic effect. On the contrary, if the open frontal area is less than 60%, the number of cells contributing to the thermoacoustic effect is too small, and so a very large thermoacoustic effect cannot be achieved therefrom.

Note here that, if the open frontal area is too high, this means too many hollows in the heat/acoustic wave conversion component 1 and so degrades the durability and the strength of the heat/acoustic wave conversion component 1 as a whole. Then, the open frontal area of the heat/acoustic wave conversion component 1 is suppressed to be 93% or less. In fact if the open frontal area exceeds 93%, damage of the heat/acoustic wave conversion component 1 due to thermal distortion and twisting (thermal stress) resulting from impacts of acoustic waves generated and a temperature difference at both ends of the heat/acoustic wave conversion component 1 cannot be ignored.

In this way, the open frontal area at the end faces of the heat/acoustic wave conversion component 1 that is 60% or more and 93% or less can achieve adequate balance between a sufficient thermoacoustic effect and sufficient durability and strength. The open frontal area of 80% or more and 93% or less is preferable in the open frontal area of 60% or more and 93% or less.

The open frontal area can be obtained by taking an image of a cross section perpendicular to the penetrating direction by a microscope, and determining the material-part area S1 and the gap-part area S2 from the taken image of the cross section. Then the open frontal area can be obtained as S2/(S1+S2) based on S1 and S2.

Further the heat capacity per unit length in the penetrating direction of the cells 14 in the heat/acoustic wave conversion component 1 tends to decrease with distance from the end face on the low-temperature side heat exchanger 3 side in FIG. 3 (the upper end face of the heat/acoustic wave conversion component 1 in FIG. 3) in this penetrating direction.

Herein, the "unit length" refers to a reference unit length to evaluate the length of the heat/acoustic wave conversion component 1, which may be any length as long as that is shorter than the length of the heat/acoustic wave conversion component 1. For instance, for the heat/acoustic wave conversion component 1 of a few cm to a few hundreds cm in length, 10 mm (1 cm) can be used as the "unit length".

Further the "tends to decrease" includes a monotonous decrease as well as an overall decrease which may be partially constant without decreasing or increasing. Numerically expressed, the "tends to decrease" means that, let that the distance from the end face on the low-temperature side heat exchanger 3 side (the upper end face of the heat/acoustic wave conversion component 1 in FIG. 3) is a variable and the heat capacity per unit length in the penetrating direction is a function whose value is determined by this variable, then the value of the gradient of this function (the derivative value by the variable) becomes always zero or a negative value, which never becomes a positive value.

Further, in the heat/acoustic wave conversion component 1 of FIG. 3, an end including the end face on the low-temperature side heat exchanger 3 side (the upper end face of the heat/acoustic wave conversion component 1 in FIG. 3) that accounts for the region of 10% of the total length of the heat/acoustic wave conversion component 1 in the penetrating direction of the cells 14 has heat capacity that is 1.1 times or more the heat capacity of an end including the end face on the high-temperature side heat exchanger 2 side (the lower end face of the heat/acoustic wave conversion component 1 in FIG. 3) that accounts for the region of 10% of the total length of the heat/acoustic wave conversion component 1 in the penetrating direction of the cells 14. In the following, the former end (the end including the end face on the low-temperature side heat exchanger 3 side) is called a first end portion, and the latter end (the end including the end face on the high-temperature side heat exchanger 2 side) is called a second end portion.

The heat capacity per unit length can be obtained as follows. Firstly, a part to be measured of the unit length is cut out, and then is pulverized to be a powder form. Then such a powder-form target is used as a sample, and then a relationship between input heat and temperature rise of the sample is examined using an adiabatic calorimeter. In this way, the heat capacity per unit mass of the sample can be obtained. Then, the thus obtained heat capacity per unit mass of the sample is multiplied by the mass of the part to be measured used as the sample before pulverization, whereby the heat capacity per unit length can be obtained. Herein, the heat capacity per unit length is divided by the cross-sectional area at the part in the plane perpendicular to the direction of the unit length, whereby heat capacity per unit volume of this part also can be obtained.

Figure 12:
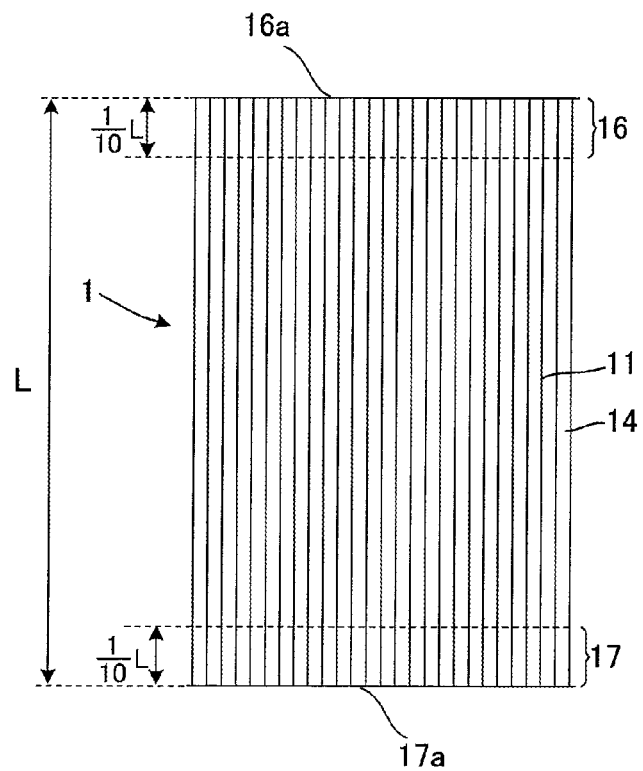
FIG. 12 is a conceptual diagram to describe a first end portion and a second end portion in the heat/acoustic wave conversion component.

FIG. 12 is a conceptual diagram to describe the first end portion and the second end portion in the heat/acoustic wave conversion component 1.

As shown in FIG. 12, the first end portion 16 that is the upper end of the heat/acoustic wave conversion component 1 is an end that accounts for the region of 10% of the total length L of the heat/acoustic wave conversion component 1, i.e., the region of the length of (1/10)L from the upper end face (a first end face 16a) of the heat/acoustic wave conversion component 1. Then, the second end portion 17 that is the lower end of the heat/acoustic wave conversion component 1 is an end that accounts for the region of 10% of the total length L of the heat/acoustic wave conversion component 1, i.e., the region of the length of (1/10)L from the lower end face (a second end face 17a) of the heat/acoustic wave conversion component 1. The heat capacity of the first end portion 16 is larger than the heat capacity of the second end portion 17, and is 1.1 times or more the heat capacity of the second end portion 17 as described above. Further, between the first end portion 16 and the second end portion 17, the heat capacity per unit length in the penetrating direction of the cells 14 tends to decrease with distance from the upper end face of FIG. 12 (the end face on the low-temperature side heat exchanger 3 side in FIG. 3) in this penetrating direction as described above. The following describes the reason to let the heat capacity per unit length have a gradient in this way in the penetrating direction of the cells 14.

As described above with reference to FIG. 1, self-induced oscillations causing a thermoacoustic effect are a motion of the working fluid to convey heat so as to alleviate (weaken) the temperature gradient. For the heat/acoustic wave conversion component 1 of FIG. 12, the working fluid in the cells 14 generates self-induced oscillations so as to alleviate the temperature gradient between the first end portion 16 side and the second end portion 17 side. For instance, when a certain amount of hot heat is given to the first end portion 16 and a certain amount of cold heat is given to the second end portion 17 (i.e., a certain amount of heat is absorbed from the second end portion 17), the self-induced oscillations of the working fluid will alleviate the temperature gradient between the first end portion 16 side and the second end portion 17 side, which is generated from the thus supplied hot heat and cold heat, gradually over time.

Herein assume that the heat capacity per unit length in the penetrating direction of the cells 14 is uniform in the heat/acoustic wave conversion component 1 in this penetrating direction. Then, the temperature gradient will be alleviated, so that it reaches a certain temperature corresponding to the heat capacity per unit length. On the contrary, in the structure as in the actual heat/acoustic wave conversion component 1 in which the heat capacity per unit length in the penetrating direction of the cells 14 decreases with distance from the upper face of FIG. 12 (the end face on the low-temperature side heat exchanger 3 side in FIG. 3) in this penetrating direction, although it naturally reaches a certain temperature finally as a whole, it has a variation of heat capacity per unit length at a stage during the course, which causes different ways of temperature-gradient alleviation locally, and in general the temperature gradient tends to remain. In other words, it takes more time to alleviate the temperature gradient in the case where the heat capacity per unit length has a variation than in the case where the heat capacity per unit length is uniform. That is, a variation in heat capacity per unit length means the tendency to keep the temperature gradient easily. Especially when the heat capacity of the first end portion 16 is 1.1 times or more the heat capacity of the second end portion 17, such an effect to keep the temperature gradient is large enough, and so an excellent heat/acoustic wave conversion function can be exerted. This point will be verified by examples described later.

Herein, a variation in heat capacity per unit length in the penetrating direction of the cells 14 can be implemented simply by using a plurality of honeycomb segments having mutually different heat capacities per unit length in the penetrating direction of the cells 14 described later.

Each of these plurality of honeycomb segments has a honeycomb structure (the structure in which a plurality of cells penetrating between two end faces are partitioned and defined by a partition wall), and is integrally formed. Herein in this honeycomb structure, each cell has a hydraulic diameter HD of 0.4 mm or less, and has an open frontal area at each end face of 60% or more and 93% or less, so that it can exert a heat/acoustic wave conversion function. Further, a honeycomb segment having the largest heat capacity per unit length in the penetrating direction of the cells 14 (hereinafter called a first honeycomb segment) among the plurality of honeycomb segments has heat capacity per unit length that is 1.1 times or more the heat capacity per unit length of the honeycomb segment having the smallest heat capacity per unit length in the penetrating direction of the cells 14 (hereinafter called a second honeycomb segment). Herein, both of the first honeycomb segment and the second honeycomb segment have the total length (the length of each honeycomb segment in the penetrating direction of the cells) that is 1/10 time or more the total sum of the total lengths of the plurality of honeycomb segments as stated above. Other than such a condition imposed about the lengths of the first honeycomb segment and the second honeycomb segment, the length of each of the plurality of honeycomb segments is not limited especially, and they may have the same length or have different lengths mutually. Alternatively, a group of honeycomb segments among the plurality of honeycomb segments may have a same length, and the remaining honeycomb segments may have mutually different lengths.

These plurality of honeycomb segments are arranged serially in the descending order of heat capacity per unit length in the penetrating direction of the cells 14 so that one end face of each honeycomb segment is opposed to one end face of another honeycomb segment of the plurality of honeycomb segments, whereby one example of the heat/acoustic wave conversion component 1 as stated above can be embodied. In this example, the first honeycomb segment includes the first end portion 16 as stated above (see FIG. 12) of the heat/acoustic wave conversion component 1, and the second honeycomb segment includes the second end portion 17 as stated above (see FIG. 12) of the heat/acoustic wave conversion component 1.

Herein, when the plurality of honeycomb segments are arranged serially, these plurality of honeycomb segments preferably are arranged so that openings of the cells at the opposed end faces are overlapped between two adjacent honeycomb segments to form one through hole (in other words, one cell formed by two cells connected). At this time, the mutually opposed end faces of the two adjacent honeycomb segments may be bonded with a bonding material while keeping the overlapped state of the openings of the cells as stated above. Note here that, in this case, the bonding layer between two adjacent honeycomb segments formed with the bonding material contributes to the "heat capacity per unit length" as stated above of the heat/acoustic wave conversion component 1 in a strict sense. However, since the bonding layer is thin, the contribution thereof is enough small. Therefore such a serial arrangement of the plurality of honeycomb segments arranged in the descending order of heat capacity per unit length can implement adequately the feature of the heat/acoustic wave conversion component 1 that shows the tendency that the heat capacity per unit length decreases with distance from one end face (the end face on the low-temperature side heat exchanger 3 side of FIG. 3) as stated above. Herein, the "unit length" in this case is a length enough larger than the thickness of the bonding layer. For instance, the unit length may be 10 mm (1 cm), which can satisfy such a condition adequately.

Instead of bonding the end faces with the bonding material, a plurality of honeycomb segments are disposed in an intimate contact state while overlapping the openings of the cells, and then such a plurality of honeycomb segments as a whole may be fitted into the interior of a cylindrical container while keeping the intimate contact state, whereby each honeycomb segment may be positioned and fixed in the interior of the container.

Further instead of positioning and fixing in such an intimate contact state, a plurality of honeycomb segments with minute gaps kept therebetween so as not to affect the transmission of acoustic waves may be fitted into the interior of a cylindrical container in the descending order of heat capacity per unit length, and then may be positioned and fixed there.

The following specifically describes examples of the heat/acoustic wave conversion component 1 made up of three honeycomb segments.

Figure 13:
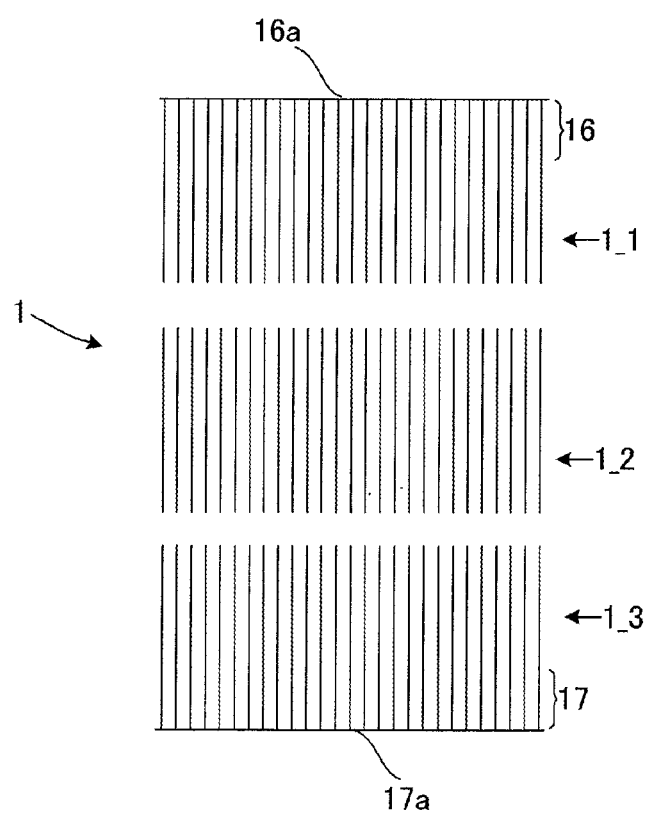
FIG. 13 schematically shows the configuration of a heat/acoustic wave conversion component including three honeycomb segments having the same equivalent circle diameter and mutually different heat capacities per unit volume.

FIG. 13 schematically shows the configuration of the heat/acoustic wave conversion component 1 including three honeycomb segments having the same equivalent circle diameter and mutually different heat capacities per unit volume.

FIG. 13 schematically shows the configuration of the heat/acoustic wave conversion component 1 while keeping a certain distance between the honeycomb segments so as to clarify that the heat/acoustic wave conversion component 1 includes the three honeycomb segments. Actually, however, the adjacent honeycomb segments are bonded with a bonding material, or are fitted into the interior of a cylindrical container while keeping an intimate contact state or keeping a minute space therebetween and are positioned as described above. In such a configuration, the openings of the cells at the mutually opposed end faces are mutually overlapped or at least opposed mutually, whereby substantially one through hole (in other words, one cell formed by two cells connected) is formed. Therefore, generated acoustic waves can be transmitted through this one through hole (one cell) smoothly.

The "equivalent circle diameter" of a honeycomb segment is defined as D in the representation of the cross-sectional area of the honeycomb segment in a plane perpendicular to the penetrating direction of the cells of the honeycomb segment as $\pi D^2/4$. In simple terms, the "equivalent circle diameter" of a honeycomb segment represents the thickness of the honeycomb segment. The heat/acoustic wave conversion component 1 of FIG. 13 includes three honeycomb segments 1_1, 1_2, and 1_3, and these three honeycomb segments 1_1, 1_2, and 1_3 have a same equivalent circle diameter, and have mutually different heat capacities per unit volume.

One method to let honeycomb segments have mutually different heat capacities per unit volume in this way may be to make up their partition walls and circumferential walls (or any one of them) with materials different in types of the compositions, for example. For instance, among the three honeycomb segments 1_1, 1_2, and 1_3, the partition wall and the circumferential wall of one honeycomb segment is made of a cordierite material, the partition wall and the circumferential wall of another honeycomb segment are made of a non-cordierite material that contains alumina, and the partition wall and the circumferential wall of the remaining honeycomb segment are made of a non-cordierite material that does not contain alumina. In this way, when materials that are different in types of components are used, the honeycomb segments can be different in heat capacity per unit volume, although their shape and size including the equivalent circle diameter as well as the open frontal area at each end face and the hydraulic diameter of each cell are the same.

Another method to let honeycomb segments have mutually different heat capacities per unit volume may be to make up the partition walls and the circumferential walls (or any one of them) of the three honeycomb segments 1_1, 1_2, and 1_3 with materials that are the same in types of the components but are different in forms of the components or the materials. For instance, materials that are different in average particle diameter of the component particles may be used, or materials that are different in porosity may be used. In this way, when materials that are different in forms of the components or the materials are used as well, the honeycomb segments can be different in heat capacity per unit volume although their shape and size including the equivalent circle diameter as well as the open frontal area at each end face and the hydraulic diameter of each cell are the same.

Still another method to let honeycomb segments have mutually different heat capacities per unit volume may be to manufacture the three honeycomb segments 1_1, 1_2, and 1_3 so that they have different partition walls and circumferential walls without changing the equivalent circle diameter. Herein in this case, they have to be configured so as to satisfy the requirements that cells of each honeycomb segment have a hydraulic diameter HD of 0.4 mm or less, and have an open frontal area at each end face of 60% or more and 93% or less as well as the requirement that at least a part of the cells at the mutually opposed end faces are mutually overlapped or are mutually opposed at least so as to form one through hole substantially (in other words, one cell formed by two cells connected).

Some methods to let honeycomb segments have mutually different heat capacities per unit volume are described above, and naturally they may be combined to realize the state of mutually different heat capacities per unit volume in spite of the same equivalent circle diameter.

Note here that, among the three honeycomb segments 1_1, 1_2, and 1_3 of FIG. 13, the uppermost honeycomb segment 1_1 has the largest heat capacity per unit volume and the lowermost honeycomb segment 1_3 has the smallest heat capacity per unit volume. Since the three honeycomb segments 1_1, 1_2, and 1_3 of FIG. 13 have the same equivalent circle diameter, the uppermost honeycomb segment 1_1 has the largest heat capacity per unit length in the penetrating direction of the cells as well, and the lowermost honeycomb segment 1_3 has the smallest heat capacity per unit length. Herein, the uppermost honeycomb segment 1_1 in FIG. 13 is the first honeycomb segment including the first end portion 16, and the lowermost honeycomb segment 1_3 in FIG. 13 is the second honeycomb segment including the second end portion 17. Then, the uppermost honeycomb segment 1_1 in FIG. 13 has heat capacity per unit length in the penetrating direction of the cells that is 1.1 times or more the heat capacity per unit length in the penetrating direction of the cells of the lowermost honeycomb segment 1_3 in FIG. 13. In this configuration, the heat capacity of the first end portion 16 naturally is 1.1 times or more the heat capacity of the second end portion 17.

Figure 14:
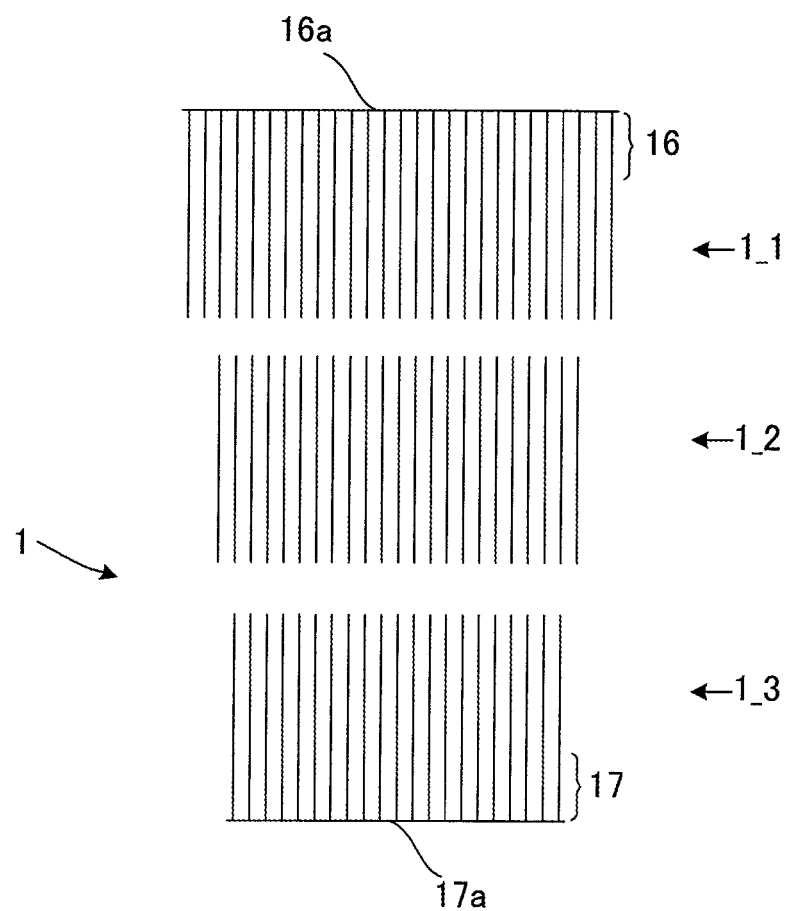
FIG. 14 schematically shows the configuration of a heat/acoustic wave conversion component including three honeycomb segments having the same heat capacity per unit volume and having mutually different equivalent circle diameters.

FIG. 14 schematically shows the configuration of the heat/acoustic wave conversion component 1 including three honeycomb segments having the same heat capacity per unit volume and having mutually different equivalent circle diameters.

FIG. 14 also schematically shows the configuration of the heat/acoustic wave conversion component 1 while keeping a certain distance between the honeycomb segments so as to clarify that the heat/acoustic wave conversion component 1 includes the three honeycomb segments. Actually, however, the adjacent honeycomb segments are bonded with a bonding material, or are fitted into the interior of a cylindrical container while keeping an intimate contact state or keeping a minute space therebetween and are positioned. In such a configuration, the openings of at least a part of the cells at the mutually opposed end faces are mutually overlapped or at least opposed mutually, whereby substantially one through hole (in other words, one cell formed by two cells connected) is formed. Therefore acoustic waves generated can be transmitted through this one through hole (one cell) smoothly.

As shown in FIG. 14, the heat/acoustic wave conversion component 1 of FIG. 14 includes three honeycomb segments 1_1, 1_2, and 1_3 having mutually different equivalent circle diameters. These three honeycomb segments 1_1, 1_2, and 1_3 are made of the same material, and have the same heat capacity per unit volume. These three honeycomb segments 1_1, 1_2, and 1_3 are the same in the total length of each honeycomb segment, the open frontal area at each end face and the hydraulic diameter of the cells as well. Herein, among the three honeycomb segments 1_1, 1_2, and 1_3 of FIG. 14, the uppermost honeycomb segment 1_1 has the largest volume and the lowermost honeycomb segment 1_3 has the smallest volume. Since the three honeycomb segments 1_1, 1_2, and 1_3 of FIG. 14 have the same heat capacity per unit volume, the uppermost honeycomb segment 1_1 has the largest heat capacity per unit length in the penetrating direction of the cells as well, and the lowermost honeycomb segment 1_3 has the smallest heat capacity per unit length. Herein, the uppermost honeycomb segment 1_1 in FIG. 14 is the first honeycomb segment including the first end portion 16, and the lowermost honeycomb segment 1_3 in FIG. 14 is the second honeycomb segment including the second end portion 17. Then, the uppermost honeycomb segment 1_1 in FIG. 14 has heat capacity per unit length in the penetrating direction of the cells that is 1.1 times or more the heat capacity per unit length in the penetrating direction of the cells of the lowermost honeycomb segment 1_3 in FIG. 14. As stated above, since the heat capacity per unit volume is the same, the upper most honeycomb segment 1_1 in FIG. 14 has the cross-sectional area perpendicular to the penetrating direction of the cells that is 1.1 times or more the cross-sectional area perpendicular to the penetrating direction of the cells of the lowermost honeycomb segment 1_3 in FIG. 14. In this configuration, the heat capacity of the first end portion 16 also naturally is 1.1 times or more the heat capacity of the second end portion 17. Herein, converting the cross-sectional area of each honeycomb segment to the equivalent circle diameter, then the upper most honeycomb segment 1_1 in FIG. 14 has the equivalent circle diameter that is $(1.1)^{1/2} \approx 1.05$ times or more the equivalent circle diameter of the lowermost honeycomb segment 1_3 in FIG. 14.

A plurality of honeycomb segments having mutually different heat capacities per unit length in the penetrating direction of the cells as in FIGS. 13 and 14 are used, whereby the heat/acoustic wave conversion component 1 can be easily embodied to have the heat capacity per unit length in the penetrating direction of the cells that changes in this direction.

The following describes other features of the heat/acoustic wave conversion component 1.

In the heat/acoustic wave conversion component 1, the cells preferably have a cross-sectional shape that is perpendicular to the penetrating direction of the cells 14 such that it is a polygonal shape whose corners are curved, and the corners of the shape preferably have a curvature radius of 0.02 mm or more and 0.1 mm or less. FIG. 11 shows an exemplary shape of the cells 14 in the enlarged view on the upper right side, where the triangle has curved corners having the curvature radius of 0.02 mm or more and 0.1 mm or less. Such a curvature radius of 0.02 mm or more means a gently curved shape, and so it can sufficiently resist an impact acting to crush the cells 14. This is based on the same reason for the shape of a hole such as a tunnel, i.e., a rounded shape is more resistant to an external force from the surrounding than an angular shape. On the other hand, if the curved part is too large, then the partition wall 11 close to the corners of the cells is thick, and accordingly a part of the through holes as the cells 14 contributing to the thermoacoustic effect will be reduced. Then, the curvature radius is set at 0.1 mm or less, whereby a high thermoacoustic effect also can be kept at the same time.

The curvature radius at the corners of the cells 14 can be measured by taking an enlarged photo of the cells 14 in a cross section perpendicular to the penetrating direction and based on the cross-sectional shapes of the cells 14.

Cells 14 may have a shape in a plane perpendicular to the penetrating direction of the cells 14 that are various polygons, such as triangles, quadrangles, pentagons and hexagons as well as ellipses (including a perfect circle shape), where triangles, quadrangles and hexagons and their combinations are preferable. As shown in the enlarged view of the cells 14 on the upper right side of the heat/acoustic wave conversion component 1 in FIG. 11, it is particularly preferable to include triangle cells 14. Such triangular cells 14 are particularly preferable because, among various polygonal shapes and elliptical cell shapes, triangular cell shapes are the most suitable for the arrangement of a lot of cells while minimizing the thickness of the partition wall. Note here that, in the case of a honeycomb structure to load catalyst for exhaust purification to remove fine particles from exhaust gas of automobiles, if their cells have corners at acute angles, fine particles easily accumulate at the corners unfortunately. Then, such a honeycomb structure does not have triangular cell shapes in many cases, although it can have such a shape in principle. On the other hand, in the case of a honeycomb structure to exert a thermoacoustic effect, such a problem does not happen to working fluid (gas such as rare gas) causing self-induced oscillations, and so triangular cell shapes (but triangles with curved corners), which are the most suitable to arrange a lot of cells, can be used positively.

Let that L denotes the length between both end faces of the heat/acoustic wave conversion component 1, the heat/acoustic wave conversion component 1 has a ratio HD/L of the hydraulic diameter HD as stated above to the length L that is 0.005 or more and less than 0.02. If HD/L is less than 0.005, the heat/acoustic wave conversion component 1 is too long as compared with the hydraulic diameter HD. Then working fluid in each cell of the heat/acoustic wave conversion component 1 will be less affected from a temperature difference between both ends of the heat/acoustic wave conversion component. In this case, heat exchange between the working fluid in each cell and the partition wall 11 is not sufficient and so a sufficient thermoacoustic effect cannot be obtained. On the other hand, if HD/L is 0.02 or more, then heat/acoustic wave conversion component 1 is too short as compared with the hydraulic diameter HD. In this case, heat is transmitted through the partition wall 11 from the high-temperature side heat exchanger 2 side to the low-temperature side heat exchanger 3 side in the heat/acoustic wave conversion component 1 before heat exchange between the working fluid in each cell and the partition wall 11 becomes sufficient. As a result, a sufficient thermoacoustic effect still cannot be obtained. Then, the heat/acoustic wave conversion component 1 is configured to have the ratio HD/L of 0.005 or more and less than 0.02, and so heat exchange between the working fluid in each cell and the partition wall 11 is sufficient. As a result, the heat/acoustic wave conversion component 1 can have a sufficient thermoacoustic effect.

In the heat/acoustic wave conversion component 1, preferably the material making up the heat/acoustic wave conversion component 1, especially the material making up the partition wall 11 has a ratio of thermal expansion at 20 to 800° C. that is 6 ppm/K or less. Herein, a ratio of thermal expansion can be measured, for example, by cutting out, from the heat/acoustic wave conversion component 1, a test piece that has a length of 10 mm or more in the penetrating direction of each cell and having an area of a cross section including the direction orthogonal to the penetrating direction that is 4 mm² or more and 100 mm² or less, and measuring the thermal expansion ratio in the penetrating direction using a differential thermal dilatometer using quartz as a reference comparative sample.

Such a ratio of thermal expansion at 20 to 800° C. of 6 ppm/K or less of the material making up the partition wall 11 can suppress damage on the heat/acoustic wave conversion component 1 when a temperature difference occurs at the both ends. A ratio of thermal expansion of 4 ppm/K or less is more preferable in the ratio of thermal expansion of 6 ppm/K or less.

Preferably the heat/acoustic wave conversion component 1 has a length L of 5 mm or more and 60 mm or less.

The heat/acoustic wave conversion component 1 having a length L in the aforementioned numerical range can achieve a sufficient thermoacoustic effect.

The following describes a method for manufacturing the heat/acoustic wave conversion component 1 described referring to FIG. 13 and FIG. 14, including a plurality of honeycomb segments having mutually different heat capacities per unit length in the penetrating direction of the cells. The following exemplifies the case where each honeycomb segment is made of a ceramic material. Firstly, the following describes the manufacturing of one honeycomb segment.

Binder, surfactant, pore former, water and the like are added to a ceramic raw material to prepare a forming raw material. The ceramic raw material preferably includes one or two or more in combination of a cordierite forming raw material, a silicon carbide-cordierite based composite material, aluminum titanate, silicon carbide, a silicon-silicon carbide based composite material, alumina, mullite, spinel, lithium aluminum silicate, and Fe—Cr—Al based alloy. Among them, a cordierite forming raw material is preferable. Herein the cordierite forming raw material is a ceramic raw material formulated to have a chemical composition in the range of 42 to 56 mass % of silica, 30 to 45 mass % of alumina and 12 to 16 mass % of magnesia, and forms cordierite after firing. The ceramic raw material preferably is contained to be 40 to 90 mass % with reference to the forming raw material as a whole.

Exemplary binder includes methyl cellulose, hydroxypropoxyl cellulose, hydroxyethylcellulose, carboxymethylcellulose, or polyvinyl alcohol. Among them, methyl cellulose and hydroxypropoxyl cellulose are preferably used together. The content of the binder is preferably 2 to 20 mass % with reference to the forming raw material as a whole.

The content of water is preferably 7 to 45 mass % with reference to the forming raw material as a whole.

Exemplary surfactant used includes ethylene glycol, dextrin, fatty acid soap, or polyalcohol. They may be used alone or in combination of two or more types. The content of the surfactant is preferably 5 mass % or less with reference to the forming raw material as a whole.

Exemplary pore former includes starch, foamable resin, water absorbable resin or silica gel.

Next, a kneaded material is prepared by kneading the forming raw material. A method for preparing a kneaded material by kneading the forming raw material is not limited especially. For instance, a kneader or a vacuum pugmill may be used for this purpose.

Next, the kneaded material is extruded, whereby a honeycomb formed body is prepared, including a partition wall defining a plurality of cells. For the extrusion, a die having a shape in accordance with the hydraulic diameter of each cell, the open frontal area, the shape of the honeycomb segment, the cell shape, and the period of the cells as stated above is preferably used. A preferable material of the die is cemented carbide having wear resistance. Values of the hydraulic diameter of each cell, the open frontal area, or the like of the honeycomb formed body are determined preferably while considering contraction generated during drying and firing described later as well.

Herein the honeycomb segment having a very small hydraulic diameter of each cell and having a large open frontal area (having large cell density) as stated above to exert a larger thermoacoustic effect cannot be manufactured by simply using an extrusion method as it is (i.e., by simply executing a similar manufacturing method using a different die to form high-density pores) that is used for a conventional honeycomb structure to load catalyst for exhaust purification, which is free from such constraints, due to the following two problems.

The first problem is that, during extrusion, kneaded material extruded at a high temperature adheres to the holes in a forming die, which easily generates clogging. This problem is mentioned by Patent Document 3 also in paragraph [0021].

The second problem is that a die used for a honeycomb structure as in the honeycomb segment as stated above having a very small hydraulic diameter of each cell and having a large open frontal area (having large cell density) inevitably includes a very thin and minute part (typically a part of about 0.3 mm in thickness). Then, such a minute part often is damaged (e.g., is torn) by viscous friction during kneaded material extrusion.

Then, the manufacturing method of the honeycomb segment as stated above has the following configuration to solve these two problems.

For the first problem, prior to the extrusion using a die (hereinafter called a real die) corresponding to the honeycomb segment as stated above having the hydraulic diameter of each cell that is 0.4 mm or less and the open frontal area that is 60% or more and 93% or less, i.e., having a very small hydraulic diameter of each cell and having a large open frontal area (having large cell density), a kneaded material is extruded using another die (hereinafter called a dummy die) having a very small thickness of ribs that is 0.04 mm or more and 0.09 mm or less. The "thickness of ribs" here refers to the thickness of the partition wall of the honeycomb formed body, and means a slit width of the die. Each slit is a hole to discharge the kneaded material and is to determine the shape of each partition wall part at the honeycomb structure to be manufactured. In the following, the "thickness of ribs" means the slit width. The extrusion using such a dummy die can remove beforehand the component of the kneaded material that tends to be a cause of the clogging. Then extrusion by a real die is performed for the kneaded material subjected to the extrusion, whereby clogging as stated above can be suppressed.

The second problem is solved by reducing viscosity of the kneaded material used for extrusion greatly as compared with the viscosity of a kneaded material used for a conventional honeycomb structure to load catalyst for exhaust purification so as to reduce the viscous friction while keeping the range of a shape-holding property (i.e. the shape of the formed body is not distorted) of the formed body of the honeycomb segment during extrusion. To reduce the viscosity of kneaded material while satisfying the condition to keep a shape-holding property in this way, the ratio of water in the kneaded material has to be more strictly controlled than in the manufacturing of a conventional honeycomb structure to load catalyst for exhaust purification (i.e., keeping an error between the control target of the water ratio and the actual water ratio in a very narrow range). Specifically, the ratio of water in the kneaded material is 40 to 42 parts by mass with reference to 100 parts by mass of the kneaded material solid component that is used to manufacture the honeycomb segment as stated above, while the ratio of water in the kneaded material is 25 to 35 parts by mass with reference to 100 parts by mass of the kneaded material solid component that is used to manufacture a conventional honeycomb structure to load catalyst for exhaust purification. When the ratio of water in the kneaded material increases, then viscosity of the kneaded material decreases and adequate fluctuations occur in the shape of the formed body of the honeycomb segment as stated above. This leads to another advantageous effect that self-induced oscillations of acoustic waves likely occur.

The following continues the description on the following processing for the honeycomb formed body that is obtained by the extrusion.

The thus obtained honeycomb formed body is dried before firing. A method for drying is not limited especially, and exemplary methods include an electromagnetic wave heating method such as microwave heat-drying and high-frequency induction heating drying and an external heating method such as hot air drying and superheated steam drying. After a certain amount of water may be dried by an electromagnetic wave heating method, followed by an external heating method to dry the remaining water. In this case, it is preferable that, after 30 to 90 mass % of water with reference to the water amount before drying is removed by an electromagnetic heating method, followed by an external heating method to reduce water amount to 3 mass % or less. A preferable electromagnetic wave heating method includes induction heating drying, and a preferable external heating method includes hot air drying.

If the length of the honeycomb formed body in the cell penetrating direction is not a desired length, it is preferable to cut both of the end faces (end parts) to have the desired length. Although a method for cutting is not limited especially, exemplary method includes a method using a circular saw cutter.

Next, the honeycomb formed body is fired. It is preferable to perform calcination before firing to remove the binder and the like. The calcination is preferably performed at 400 to 500° C. for 0.5 to 20 hours in the ambient atmosphere. A method for calcination or firing is not limited especially, and they may be performed using an electric furnace, a gas furnace, or the like. As the firing conditions, it is preferably heated at 1,300 to 1,500° C. for 1 to 20 hours in an inert atmosphere of nitrogen, argon, or the like when a silicon-silicon carbide based composite material is used, for example. When an oxide-based material is used, it is preferably heated at 1,300 to 1,500° C. for 1 to 20 hours in an oxygen atmosphere.

Finally, if it is required to be a desired cross-sectional shape (e.g., a circle as in FIG. 11) of the honeycomb segment, the circumferential part of the honeycomb formed body after the firing step is cut as needed to correct the shape. Then, an outer coating material is applied to the circumferential face of the honeycomb formed body after cutting, followed by drying, whereby a circumferential wall 13 is formed. Herein, the outer coating material used may be slurry, for example, which is prepared by adding an additive such as organic binder, foamable resin or dispersing agent to a raw material including inorganic particles and colloidal oxide, to which water is added, followed by kneading. Herein exemplary inorganic particles include particles made of a ceramic material containing one or two or more in combination of cordierite, alumina, aluminum titanate, silicon carbide, silicon nitride, mullite, zirconia, zirconium phosphate and titania, or particles of Fe—Cr—Al-based metal, nickel-based metal and silicon (metal silicon)-silicon carbide based composite materials. Exemplary colloidal oxide includes silica sol and alumina sol. A method for applying the outer coating material is not limited especially, and for example, the coating material may be coated with a rubber spatula, for example, while rotating the honeycomb formed body after cutting on a wheel.

In this way, one honeycomb segment is manufactured.

Another honeycomb segment is manufactured by the manufacturing method similar to the above manufacturing method using a forming raw material that is the same as the forming raw material used in the manufacturing method of the one honeycomb segment as stated above other than the type of the components of the ceramic raw material. Alternatively, another honeycomb segment is manufactured by the manufacturing method similar to the above manufacturing method using a forming raw material that is the same as the forming raw material used in the manufacturing method of the one honeycomb segment as stated above other than the particle diameter of the components in the ceramic raw material or the amount of the pore former. Still alternatively, another honeycomb segment is manufactured by the manufacturing method similar to the above manufacturing method using a die for honeycomb segment of an equivalent circle diameter that is different from that of the die for honeycomb segment used in the manufacturing method of the one honeycomb segment as stated above.

In this way, honeycomb segments are manufactured by the similar manufacturing method while changing the ceramic raw material or the die, and finally a plurality of honeycomb segments having mutually different heat capacities per unit length in the penetrating direction of the cells can be manufactured. At this time, the details of the ceramic raw materials or the equivalent circle diameters of the honeycomb segments is adjusted appropriately so that the honeycomb segment (first honeycomb segment) having the largest heat capacity per unit length in the penetrating direction of the cells and the honeycomb segment (second honeycomb segment) having the smallest heat capacity per unit length in the penetrating direction of the cells have the total length that is 1/10 time or more the total sum of the total lengths of the plurality of honeycomb segments, and the heat capacity per unit length in the penetrating direction of the cells of the first honeycomb segment is 1.1 times or more the heat capacity per unit length in the penetrating direction of the cells of the second honeycomb segment.

These plurality of honeycomb segments are arranged serially in the descending order of heat capacity per unit length in the penetrating direction of the cells so that one end face of each honeycomb segment is opposed to one end face of another honeycomb segment of the plurality of honeycomb segments. At this time, the plurality of honeycomb segments are arranged serially so that the openings of the cells at the mutually opposed end faces are mutually overlapped between two adjacent honeycomb segments so as to form one through hole (in other words, one cell formed by two cells connected). Herein in order to keep such a serially arranged state, the end faces of the mutually opposed honeycomb segments are bonded with a bonding material as needed. As the bonding material, the material mentioned for the material of the outer coating material as stated above may be used. Alternatively, instead of bonding with the bonding material, the plurality of honeycomb segments are disposed in an intimate contact state while overlapping the openings of the cells, and then such a plurality of honeycomb segments may be fitted into the interior of a cylindrical container while keeping the intimate contact state, whereby each honeycomb segment may be positioned and fixed in the interior of the container. Further instead of positioning and fixing in such an intimate contact state, the plurality of honeycomb segments with minute gaps kept therebetween so as not to affect the transmission of acoustic waves may be fitted into the interior of a cylindrical container in the descending order of heat capacity per unit length, and may be positioned and fixed there.

Through the steps as stated above, the heat/acoustic wave conversion component 1 is finally completed.

Next, the following describes a method for manufacturing the high-temperature side heat exchanger 2 in FIG. 3.

The heat-exchanging honeycomb structure 20 in the high-temperature side heat exchanger 2 of FIG. 3 can be manufactured by a manufacturing method similar to the method for manufacturing the monolithic heat/acoustic wave conversion component 1 in FIG. 11 as stated above, other than that mixture of carbon powder (e.g., graphite powder) with SiC powder is used as the ceramic raw material and a die, suitable for a honeycomb formed body having a relatively large hydraulic diameter HD of cells is used as the die for extrusion.

To manufacture this heat-exchanging honeycomb structure 20, for example, including a Si impregnated SiC composite material as a main component, it is preferable that a kneaded material prepared by mixing SiC powder with carbon powder and kneading for adjustment is formed to be a honeycomb formed body, then drying and sintering processing are performed thereto, and then molten silicon (Si) is impregnated in this honeycomb formed body. Such processing can form a configuration where coagulation of metal Si (metal silicon) surrounds the surface of SiC particles after the sintering processing, and SiC particles are mutually bonded via metal Si. Such a configuration can achieve high heat durability and heat conductivity in spite of the dense configuration with small porosity.

In addition to the molten silicon (Si), other metals such as Al, Ni, Cu, Ag, Be, Mg, and Ti may be used for impregnation. In this case, after sintering, coagulation of metal Si (metal silicon) and other metals used for impregnation surrounds the surface of SiC particles, and SiC particles are mutually bonded via metal Si and other metals used for impregnation in the formed configuration. Such a configuration also can achieve high heat durability and heat conductivity in spite of the dense configuration with small porosity.

As the outer coating material of the heat-exchanging honeycomb structure 20 as well, particles of silicon (metal silicon)-silicon carbide based composite material is preferably used for the same reason as stated above, among the particles made of the materials as stated above as the candidates of inorganic particles of the material of the outer coating material (the material as the bonding material of the heat/acoustic wave conversion component 1).

It is preferable to perform slit formation processing to form a slit in the cell penetrating direction at the circumferential wall formed by the application of the outer coating material. When the slit formation processing is performed, a heat resistant metal plate 21*d* and a fin 21*e* may be formed when the high-temperature side annular tube 21 is manufactured as described below.

The high-temperature side annular tube 21 on the high-temperature side heat exchanger 2 in FIG. 3 is prepared by forming a material of high heat resistance to be an annular shape (herein, the annular shape such that a part of the wall face on the center side is partially omitted so that, when being coupled with the heat-exchanging honeycomb structure 20, a part of the circumferential wall of the heat-exchanging honeycomb structure 20 is exposed in the high-temperature side annular tube). Such a material of high heat resistance is not limited especially, and specific examples include metal such as stainless steel and copper of high heat resistance and ceramic materials (e.g., those listed as the materials of the heat/acoustic wave conversion component 1 in FIG. 11 and the heat-exchanging honeycomb structure 20).

The high-temperature side heat exchanger 2 in FIG. 3 is completed basically by assembling the heat-exchanging honeycomb structure 20 at a center part that is a hole at the annular shape of the high-temperature side annular tube 21.

Next the following describes a method for manufacturing the low-temperature side heat exchanger 3 in FIG. 3. When a conventionally known heat exchanger is used as the low-temperature side heat exchanger 3, a method for manufacturing such a conventionally known heat exchanger can be used. When the device having the same configuration as that of the high-temperature side heat exchanger 2 stated above is used as the low-temperature side heat exchanger 3, the same manufacturing method as that of the high-temperature side heat exchanger 2 as stated above can be used.

As other members of the heat/acoustic wave conversion unit 100 in FIG. 3, e.g., the metal member 32, the housing 100*a*, and the interference member 1*a*, those conventionally known can be used, and they can be manufactured by a conventionally known method.

EXAMPLES

The following describes the present invention more specifically by way of examples, and the present invention is by no means limited to these examples.

Example 1

A heat/acoustic wave conversion component of Example 1 includes two honeycomb segments having different heat capacities per unit length in the penetrating direction of the cells. The following firstly describes the manufacturing of one honeycomb segment. Cordierite forming raw material was used as the ceramic raw material. Then 1 part by mass of pore former, 35 parts by mass of dispersing medium, 6 parts by mass of organic binder, and 0.5 part by mass of dispersing agent were added to 100 parts by mass of the cordierite forming raw material, followed by mixing and kneading to prepare a kneaded material. The cordierite forming raw material used included 38.9 parts by mass of talc of 3 μm in average particle diameter, 40.7 parts by mass of kaolin of 1 μm in average particle diameter, 5.9 parts by mass of alumina of 0.3 μm in average particle diameter, and 11.5 parts by mass of boehmite of 0.5 μm in average particle diameter. Herein the average particle diameter refers to a median diameter (d50) in the particle distribution of each raw material.

Water was used as the dispersing medium. Hydroxypropylmethylcellulose was used as the organic binder. Ethylene glycol was used as the dispersing agent.

Next, the thus obtained kneaded material was extruded using a die, so that a honeycomb formed body of a circular shape as the overall shape including triangular cells was prepared. During this extrusion, prior to the extrusion using a regular die corresponding to the heat/acoustic wave conversion component of Example 1, the kneaded material was extruded using a dummy die of about 0.07 mm in rib thickness as stated above. Then, using the kneaded material after the extrusion using this dummy die, extrusion using the real die was executed. At this time, the ratio of water in the kneaded material used for the extrusion using the real die was strictly controlled in the kneaded material component so that it was 41 parts by mass (error was within ±1 part by mass) with reference to 100 parts by mass of the kneaded material solid component.

Then, this honeycomb formed body was dried by a microwave dryer, and then was dried completely by a hot-air drier, and then both end faces of the honeycomb formed body were cut so as to adjust the length of the honeycomb formed body in the cell penetrating direction. Such a honeycomb formed body was dried by a hot-air drier, and then was fired at 1,445° C. for 5 hours.

Finally, the circumferential part of the honeycomb formed body after firing was cut as needed to correct the shape to be a circular shape. Then, an outer coating material was applied to the circumferential face of the honeycomb formed body after cutting, followed by drying, whereby a circumferential wall 13 was formed. Herein, the outer coating material was slurry prepared by adding organic binder, foamable resin and dispersing agent to a raw material including cordierite particles and silica sol, to which water was added and kneaded. As a method for applying the outer coating material, the coating material was coated with a rubber spatula, for example, while rotating the honeycomb formed body after cutting on a wheel.

Through these steps, one honeycomb segment was completed.

The other honeycomb segment was manufactured having relatively small heat capacity per unit length in the penetrating direction of the cells by a similar method other than that a cordierite forming raw material had a partially different particle diameter from the cordierite forming raw material of the one honeycomb segment as stated above. The honeycomb segment having a relatively large heat capacity as stated above was the first honeycomb segment and this honeycomb segment having a relatively small heat capacity was the second honeycomb segment. The two honeycomb segments had the same shape and size including their equivalent circle diameter, other than that they were different in heat capacity per unit volume due to their different materials, and had the same open frontal area at each end face and the hydraulic diameter of the cells as well. Therefore, since the first honeycomb segment and the second honeycomb segment had the same total length, they naturally had $1/10$ time or more the total sum of the total lengths of the two honeycomb segments.

These two honeycomb segments were arranged serially so that one end face of one of the honeycomb segments is opposed to one end face of the other honeycomb segment. At this time, the two honeycomb segments were arranged serially so that the openings of the cells at the mutually opposed end faces were mutually overlapped so that one through hole (in other words, one cell formed by two cells connected) was formed. In order to keep such a serially arranged state, the end faces of the mutually opposed honeycomb segments were bonded with a bonding material. As the bonding material, the same material as the outer coating material as stated above was used.

In this way, the heat/acoustic wave conversion component of Example 1 was finally completed.

For the thus completed heat/acoustic wave conversion component of Example 1, the following properties were measured including: the hydraulic diameter HD of the cells in a plane perpendicular (perpendicular plane) to the cell penetrating direction; the open frontal area at each end face of the heat/acoustic wave conversion component; the heat capacity of the first end portion and the second end portion; the heat capacity per unit volume of the first honeycomb segment and the second honeycomb segment, and the equivalent circle diameter of the first honeycomb segment and the second honeycomb segment. Herein the first end portion is an end of the heat/acoustic wave conversion component included in the first honeycomb segment, and has a length that is ($1/10$) time of the total length of the heat/acoustic wave conversion component. Meanwhile, the second end portion is an end of the heat/acoustic wave conversion component included in the second honeycomb segment, and has a length that is ($1/10$) time of the total length of the heat/acoustic wave conversion component.

The hydraulic diameter HD of the cells was obtained as follows. That is, an enlarged photo of the cross section of the heat/acoustic wave conversion component in the perpendicular plane was taken, and 10 cells were selected at random in this enlarged photo of the cross section. Then, the hydraulic diameter of each was calculated by the expression to define the hydraulic diameter: $HD=4 \times S/C$, where S denotes the cross-sectional area of the cell and C denotes the perimeter of this section, and then average of them was calculated as the hydraulic diameter.

The open frontal area was obtained by taking an image of the cross section in the perpendicular plane by a microscope, and determining the material-part area S1 and the gap-part area S2 from the image taken of the cross section. Then the open frontal area was obtained as $S2/(S1+S2)$ based on S1 and S2. Note that the open frontal area at the cross section as a whole is considered to be equal to the open frontal area at the end face, and then the open frontal area at the cross section as a whole is considered as the open frontal area at the end face.

The heat capacity of the first end portion and the second end portion was obtained as follows. Firstly their parts were cut out, and then each was pulverized to be a powder form. Such a powder form target was used as a sample, and then a relationship between input heat and temperature rise of the sample was examined using an adiabatic calorimeter. In this way, the heat capacity per unit mass of the sample was obtained. Next, the thus obtained heat capacity per unit mass was multiplied by the mass of the part, whereby the heat capacity of the part was obtained.

The heat capacity per unit volume of the first honeycomb segment and the second honeycomb segment was the same as the heat capacity per unit volume of the first end portion and the second end portion. Therefore the heat capacity per unit volume of the first honeycomb segment and the second honeycomb segment was obtained by dividing the heat capacity of the first end portion and the second end portion as stated above by the volume of the first end portion and the second end portion, respectively.

Based on the measurement values obtained through the measurement as stated above, the following five types of parameters were obtained. The following five types of parameters include ones that are not independent mutually and change together with other parameters, but such parameters also are described for the sake of descriptions.

(1) hydraulic diameter HD of the cells in a plane perpendicular (perpendicular plane) to the cell penetrating direction, (2) open frontal area at the cross section as a whole of the heat/acoustic wave conversion component (the same as the open frontal area at each end face), (3) the ratio of the heat capacity of the first end portion to the heat capacity at the second end portion, (4) the ratio of the heat capacity per unit volume of the first honeycomb segment to the heat capacity per unit volume of the second honeycomb segment, and (5) the ratio of the equivalent circle diameter of the first honeycomb segment to the equivalent circle diameter of the second honeycomb segment.

The following experiments were conducted using the heat/acoustic wave conversion component of Example 1.

Firstly, the heat/acoustic wave conversion component of Example 1 was assembled in the power generation system 1000 of FIG. 1, instead of the heat/acoustic wave conversion component 1. Then, exhaust gas from an automobile at about 500° C. was allowed to flow into the high-temperature side heat exchanger 2 for 10 minutes, and the temperature of the exhaust gas flowing out whose temperature fell to some extent was measured. Based on a temperature change at this time, the amount of heat flowing into this power generation system was calculated. Due to the flowing-in of this exhaust gas, the end of the heat/acoustic wave conversion component on the side of the high-temperature side heat exchanger 2 had a temperature kept about at 500° C. Meanwhile, water at 60° C. was allowed to flow into the low-temperature side heat exchanger 3 for 10 minutes so as to let the end of the heat/acoustic wave conversion component on the side of the low-temperature side heat exchanger 3 keep the temperature at 60° C. Then, measurement was performed using a microphone or the like as the energy converter of the power generation system 1000 of FIG. 1 as to what degree of electric power was generated from acoustic waves by a thermoacoustic effect due to the temperature difference between the both ends of the heat/acoustic wave conversion component as stated above. Then, a measurement value of the electric power amount was divided by the energy conversion efficiency (efficiency to convert acoustic-wave energy into electric power) of the microphone known beforehand, whereby an estimated value of acoustic-wave energy was obtained. Then, based on this estimated value of acoustic wave energy and the amount of heat flowing into the power generation system as stated above, energy conversion efficiency from heat to acoustic-wave energy was obtained. In this experiment, working fluid in the looped tube 4, the resonant tube 5 and the cells causing self-induced oscillations was helium gas at 10 atm.

Example 2 and Comparative Example 1

Heat/acoustic wave conversion components as Example 2 and Comparative Example 1 were manufactured by the same manufacturing method as that of the manufacturing method of Example 1 as stated above except that a die used for extrusion was different, where these heat/acoustic wave conversion components were different from Example 1 only in the values of the hydraulic diameter HD of the cells among the five types of parameters as stated above.

Then, the experiment similar to that for Example 1 was conducted for these Example 2 and Comparative Example 1.

Examples 3, 4 and Comparative Examples 2, 3

Heat/acoustic wave conversion components as Examples 3, 4 and Comparative Examples 2, 3 were manufactured by the same manufacturing method as that of the manufacturing method of Example 1 as stated above except that a die used for extrusion was different, where these heat/acoustic wave conversion components were mainly different from Example 1 in the values of the open frontal area of each end face (the same as the open frontal area of the perpendicular plane) of the heat/acoustic wave conversion component among the five types of parameters as stated above.

Then, the experiment similar to that for Example 1 was conducted for these Examples 3, 4 and Comparative Examples 2, 3.

Comparative Examples 4, 5 and Examples 5 to 8

Heat/acoustic wave conversion components as Comparative Examples 4, 5 and Examples 5 to 8 were manufactured by the same manufacturing method as that of the manufacturing method of Example 1 as stated above except that the cordierite forming raw material used had compositions different from those of the cordierite forming raw material used to prepare a honeycomb segment (first honeycomb segment) having relatively large heat capacity per unit length in the cell penetrating direction, where these heat/acoustic wave conversion components were different from Example 1 only in the values of the ratio of the heat capacity of the first end portion to the heat capacity of the second end portion and the ratio of the heat capacity per unit volume of the first honeycomb segment to the heat capacity per unit volume of the second honeycomb segment among the five types of parameters as stated above.

Then, the experiment similar to that for Example 1 was conducted for these Comparative Examples 4, 5 and Examples 5 to 8.

Comparative Example 6, Example 9 and Example 10

Heat/acoustic wave conversion components as Comparative Example 6, Example 9 and Example 10 were manufactured by the same manufacturing method as that of the manufacturing method of Example 1 as stated above, in which the cordierite forming raw material having the same composition as that used to prepare the first honeycomb segment was used to prepare a second honeycomb segment, but different dies were used for the extrusion therebetween, and these heat/acoustic wave conversion components were different from Example 1 only in the values of the ratio of the heat capacity of the first end portion to the heat capacity of the second end portion and the ratio of the equivalent circle diameter of the first honeycomb segment to the equivalent circle diameter of the second honeycomb segment among the five types of parameters as stated above. Herein the first honeycomb segment and the second honeycomb segment of Comparative Example 6, Example 9 and Example 10 had the same heat capacity per unit volume, open frontal area at each end face and the hydraulic diameter of the cells, but they had mutually different equivalent circle diameters (thicknesses).

Then, the experiment similar to that for Example 1 was conducted for these Comparative Example 6, Example 9 and Example 10.

Comparative Example 7, Example 11 and Example 12

A first honeycomb segment was prepared by the manufacturing method of the first honeycomb segment of Example 1 as stated above, and another honeycomb segment having a relatively small equivalent circle diameter compared with the first honeycomb segment was prepared by the same manufacturing method as the manufacturing method of the first honeycomb segment of Example 1 other than that a different die was used for the extrusion. Further a third honeycomb segment having a relatively small equivalent circle diameter compared with such honeycomb segment having a relatively small equivalent circle diameter was prepared by the same manufacturing method as the manufacturing method of the honeycomb segment having a relatively small equivalent circle diameter other than that a different die was used for the extrusion. These three honeycomb segments were arranged in the descending order of equivalent circle diameter (i.e., in the descending order of the heat capacity per unit length), and their end faces were bonded in the same manner as in Example 1 to manufacture the heat/acoustic wave conversion component. This heat/acoustic wave conversion component is of the same type as of the heat/acoustic wave conversion component in FIG. 14. Three of such a heat/acoustic wave conversion component each including the three honeycomb segments were prepared, having mutually different ratios of the equivalent circle diameter of the honeycomb segment (first honeycomb segment) having the largest equivalent circle diameter to the equivalent circle diameter of the honeycomb segment (second honeycomb segment) having the smallest equivalent circle diameter, and so having mutually different ratios of the heat capacity of the first end portion to the heat capacity of the second end portion. These heat/acoustic wave conversion components manufactured were Comparative Example 7, Example 11 and Example 12.

Then, the experiment similar to that for Example 1 was conducted for these Comparative Example 7, Example 11 and Example 12.

The following Table 1 shows the experimental results of Examples 1 to 12 and Comparative Examples 1 to 7 as explained above, together with the values of parameters.

In Table 1, as is found from a comparison between Comparative Examples 4, 5 and Examples 5 to 8 having mutually different values of the ratio of the heat capacity of the first end portion to the heat capacity of the second end portion (and the ratio of the heat capacity per unit volume of the first honeycomb segment to the heat capacity per unit volume of the second honeycomb segment), Examples 5 to 8 had much higher energy conversion efficiency than Comparative Examples 4 and 5. This shows that the heat capacity of the first end portion being 1.1 times or more the heat capacity of the second end portion is required to exert a large thermoacoustic effect.

In Table 1, as is found from a comparison between Comparative Example 6, Example 9 and Example 10 having mutually different values of the ratio of the heat capacity of the first end portion to the heat capacity of the second end portion (and the ratio of the equivalent circle diameter of the first honeycomb segment to the equivalent circle diameter of the second honeycomb segment), Examples 9 and 10 had

TABLE 1

| | Cell hydraulic diameter HD (mm) | Open frontal area at end face (%) | (Heat capacity at first end portion)/(heat capacity at second end portion) | (Heat capacity per unit volume of first honeycomb segment)/(heat capacity per unit volume of second honeycomb segment) | (Equivalent circle diameter of first honeycomb segment)/(equivalent circle diameter of second honeycomb segment) | Number of honeycomb segments | Energy conversion efficiency (%) |
|---|---|---|---|---|---|---|---|
| Ex. 1 | 0.25 | 74 | 1.20 | 1.20 | 1.000 | 2 | 18.3 |
| Ex. 2 | 0.40 | 74 | 1.20 | 1.20 | 1.000 | 2 | 13.8 |
| Comp. Ex. 1 | 0.45 | 74 | 1.20 | 1.20 | 1.000 | 2 | 10.0 |
| Comp. Ex. 2 | 0.25 | 55 | 1.20 | 1.20 | 1.000 | 2 | 8.8 |
| Ex. 3 | 0.25 | 60 | 1.20 | 1.20 | 1.000 | 2 | 17.6 |
| Ex. 4 | 0.25 | 93 | 1.20 | 1.20 | 1.000 | 2 | 20.0 |
| Comp. Ex. 3 | 0.25 | 95 | 1.20 | 1.20 | 1.000 | 2 | — |
| Comp. Ex. 4 | 0.25 | 74 | 1.07 | 1.07 | 1.000 | 2 | 11.0 |
| Comp. Ex. 5 | 0.25 | 74 | 1.08 | 1.08 | 1.000 | 2 | 12.0 |
| Ex. 5 | 0.25 | 74 | 1.10 | 1.10 | 1.000 | 2 | 15.0 |
| Ex. 6 | 0.25 | 74 | 1.11 | 1.11 | 1.000 | 2 | 16.0 |
| Ex. 7 | 0.25 | 74 | 1.15 | 1.15 | 1.000 | 2 | 23.0 |
| Ex. 8 | 0.25 | 74 | 1.20 | 1.20 | 1.000 | 2 | 20.0 |
| Comp. Ex. 6 | 0.25 | 74 | 1.07 | 1.00 | 1.034 | 2 | 12.0 |
| Ex. 9 | 0.25 | 74 | 1.11 | 1.00 | 1.054 | 2 | 18.0 |
| Ex. 10 | 0.25 | 74 | 1.30 | 1.00 | 1.140 | 2 | 26.0 |
| Comp. Ex. 7 | 0.25 | 74 | 1.05 | 1.00 | 1.025 | 3 | 13.0 |
| Ex. 11 | 0.25 | 74 | 1.11 | 1.00 | 1.054 | 3 | 23.0 |
| Ex. 12 | 0.25 | 74 | 1.30 | 1.00 | 1.140 | 3 | 28.0 |

In Table 1, as is found from a comparison between Examples 1, 2 and Comparative Example 1 having mutually different hydraulic diameters HD of the cells, Examples 1 and 2 had higher energy conversion efficiency than Comparative Example 1. This shows that the hydraulic diameter HD of cells of 0.4 mm or less is required to exert a large thermoacoustic effect.

In Table 1, as is found from a comparison between Examples 3, 4 and Comparative Example 2 having mutually different open frontal area at each end face (open frontal area at the perpendicular face), Examples 3, 4 had higher energy conversion efficiency than Comparative Example 2. Herein, the heat/acoustic wave conversion component as Comparative Example 3 was broken during the experiment, and so the experiment was stopped, so that the final result was not obtained for the energy conversion efficiency. Presumably this is because the component lacked the strength and durability due to too large open frontal area. Considering the results of Examples 3, 4 and Comparative Examples 1, 2 as stated above, the open frontal area at the end face of a heat/acoustic wave conversion component that is 60% or more and 93% or less is required to have a large thermoacoustic effect achieved and to avoid damage.

much higher energy conversion efficiency than Comparative Example 6. This also shows that the heat capacity of the first end portion being 1.1 times or more the heat capacity of the second end portion is required to exert a large thermoacoustic effect.

In Table 1, as is found from a comparison between Comparative Example 7, Example 11 and Example 12 each including three honeycomb segments and having mutually different values of the ratio of the heat capacity of the first end portion to the heat capacity of the second end portion (and the ratio of the equivalent circle diameter of the first honeycomb segment to the equivalent circle diameter of the second honeycomb segment), Examples 11 and 12 had much higher energy conversion efficiency than Comparative Example 7. This also shows that the heat capacity of the first end portion being 1.1 times or more the heat capacity of the second end portion is required to exert a large thermoacoustic effect.

The present invention is favorably used in a system that effectively uses heat from exhaust gas of automobiles or the like to generate electric power and cold heat.

DESCRIPTION OF REFERENCE NUMERALS

1: heat/acoustic wave conversion component
1a: interference member
1_1, 1_2, 1_3: honeycomb segment
2, 2', 2A, 2A': high-temperature side heat exchanger
3, 3A: low-temperature side heat exchanger
4: looped tube
4': looped tube
5: resonant tube
5': transmission tube
6: energy converter
7: acoustic-wave generation part
11: partition wall
13: circumferential wall
14: cell
16: first end portion
16a: first end face
17: second end portion
17a: second end face
20: heat-exchanging honeycomb structure
20': heat-exchanging honeycomb structure
20a: partition wall
20b: circumferential wall
20c: slit
20d: cell
20s: contact face
21: high-temperature side annular tube
211: high-temperature side annular tube
212: high-temperature side annular tube
2110: in-tube honeycomb structure
2120: in-tube honeycomb structure
21a: inflow port
21b: outflow port
21c: heat-receiving region
21d: heat-resistance metal plate
21e: fin
22, 23: honeycomb structure
23': metal mesh member
22a: metal outer tube
23a: metal mesh outer tube
23b: metalized layer
30: mesh lamination body
31: low-temperature side annular tube
31a: inflow port
31b: outflow port
32: metal member
100: heat/acoustic wave conversion unit
200: heat/acoustic wave conversion unit
100a: housing
1000: power generation system
2000: cold heat generation system

What is claimed is:

1. A heat/acoustic wave conversion component having a first end face and a second end face, comprising a partition wall that defines a plurality of cells extending from the first end face to the second end face, inside of the cells being filled with working fluid that oscillates to transmit acoustic waves, the heat/acoustic wave conversion component mutually converting heat exchanged between the partition wall and the working fluid and energy of acoustic waves resulting from oscillations of the working fluid, wherein the heat/acoustic wave conversion component has a hydraulic diameter HD that is 0.4 mm or less, the hydraulic diameter HD being defined as HD=4×S/C, where S denotes an area of a cross section of each cell perpendicular to the cell extending direction and C denotes a perimeter of the cross section, the heat/acoustic wave conversion component has an open frontal area at each end face of 60% or more and 93% or less, the heat/acoustic wave conversion component has heat capacity per unit length in the extending direction that tends to decrease with distance from the first end face in the extending direction, and the heat/acoustic wave conversion component has a first end portion on the first end face side that accounts for a region of 10% of a total length of the heat/acoustic wave conversion component in the extending direction, and a second end portion on the second end face side that accounts for a region of 10% of the total length of the heat/acoustic wave conversion component in the extending direction, the first end portion having heat capacity that is 1.1 times or more the heat capacity of the second end portion.

2. The heat/acoustic wave conversion component according to claim 1, comprising:

a plurality of monolithic honeycomb segments each including a partition wall that defines a plurality of cells extending between two end faces of each honeycomb segment, inside of the cells being filled with the working fluid, the honeycomb segments mutually converting heat exchanged between the partition wall and the working fluid and energy of acoustic waves resulting from oscillations of the working fluid, wherein the heat/acoustic wave conversion component includes the plurality of honeycomb segments that are arranged serially from the first end face to the second so that one end face of each honeycomb segment abuts one end face of another honeycomb segment of the plurality of honeycomb segments, the cells of each of the plurality of honeycomb segments have a hydraulic diameter that is 0.4 mm or less, each of the plurality of honeycomb segments has an open frontal area at each end face of 60% or more and 93% or less, the plurality of honeycomb segments have mutually different heat capacities per unit length in the extending direction, and are arranged serially in a descending order of heat capacity per unit length in the extending direction from the first end face to the second end face, a first honeycomb segment of the serially arranged plurality of honeycomb segments that has the first end face as one end face thereof includes the first end portion of the heat/acoustic wave conversion component, and a second honeycomb segment of the serially arranged plurality of honeycomb segments that has the second end face as one end face thereof includes the second end portion of the heat/acoustic wave conversion component.

3. The heat/acoustic wave conversion component according to claim 2, wherein heat capacity per unit volume of the first honeycomb segment is the same as heat capacity per unit volume of the second honeycomb segment, and an equivalent circle diameter of the first honeycomb segment is 1.05 times or more an equivalent circle diameter of the second honeycomb segment.

4. A heat/acoustic wave conversion unit, comprising the heat/acoustic wave conversion component according to claim 3, in a state where inside of the plurality of cells is filled with the working fluid and when there is a temperature difference between the first end portion and the second, the heat/acoustic wave conversion component oscillating the working fluid in the extending direction in accordance with the temperature difference and generating acoustic waves; and a pair of heat exchangers that are disposed in a vicinity of the first end portion and the second end portion of the heat/acoustic wave conversion component, respectively, the heat exchangers exchanging heat with the both end portions to give a temperature difference between the both end portions.

5. A heat/acoustic wave conversion unit comprising:
the heat/acoustic wave conversion component according to claim 3, in a state where inside of the plurality of cells is filled with the working fluid, and when the working fluid oscillates in the extending direction while receiving acoustic waves transmitted, the heat/acoustic wave conversion component generating a temperature difference between the first end portion and the second end portion in accordance with oscillations of the working fluid;

a heat exchanger that is disposed in a vicinity of one of the first end portion and the second end portion of the heat/acoustic wave conversion component, the heat exchanger supplying heat to the one end portion or absorbing heat from the one end portion to keep a temperature at the one end portion constant; and a hot heat/cold heat output unit that is disposed in a vicinity of the other of the first end portion and the second end portion of the heat/acoustic wave conversion component, the hot heat/cold heat output unit outputting hot heat or cold heat obtained by exchanging of heat with the other end portion so that, in a state where the temperature of the one end portion is kept constant by the heat exchanger and when the heat/acoustic wave conversion component receives acoustic waves transmitted, the other end portion has a temperature difference in accordance with oscillations of the working fluid due to transmission of the acoustic waves with reference to the one end portion kept at the constant temperature.

6. The heat/acoustic wave conversion component according to claim 2, wherein
heat capacity per unit volume of the first honeycomb segment is 1.1 times or more heat capacity per unit volume of the second honeycomb segment, and
an equivalent circle diameter of the first honeycomb segment is the same as an equivalent circle diameter of the second honeycomb segment.

7. A heat/acoustic wave conversion unit, comprising the heat/acoustic wave conversion component according to claim 6, in a state where inside of the plurality of cells is filled with the working fluid and when there is a temperature difference between the first end portion and the second, the heat/acoustic wave conversion component oscillating the working fluid in the extending direction in accordance with the temperature difference and generating acoustic waves; and a pair of heat exchangers that are disposed in a vicinity of the first end portion and the second end portion of the heat/acoustic wave conversion component, respectively, the heat exchangers exchanging heat with the both end portions to give a temperature difference between the both end portions.

8. A heat/acoustic wave conversion unit comprising:
the heat/acoustic wave conversion component according to claim 6, in a state where inside of the plurality of cells is filled with the working fluid, and when the working fluid oscillates in the extending direction while receiving acoustic waves transmitted, the heat/acoustic wave conversion component generating a temperature difference between the first end portion and the second end portion in accordance with oscillations of the working fluid;

a heat exchanger that is disposed in a vicinity of one of the first end portion and the second end portion of the heat/acoustic wave conversion component, the heat exchanger supplying heat to the one end portion or absorbing heat from the one end portion to keep a temperature at the one end portion constant; and a hot heat/cold heat output unit that is disposed in a vicinity of the other of the first end portion and the second end portion of the heat/acoustic wave conversion component, the hot heat/cold heat output unit outputting hot heat or cold heat obtained by exchanging of heat with the other end portion so that, in a state where the temperature of the one end portion is kept constant by the heat exchanger and when the heat/acoustic wave conversion component receives acoustic waves transmitted, the other end portion has a temperature difference in accordance with oscillations of the working fluid due to transmission of the acoustic waves with reference to the one end portion kept at the constant temperature.

9. A heat/acoustic wave conversion unit, comprising the heat/acoustic wave conversion component according to claim 2, in a state where inside of the plurality of cells is filled with the working fluid and when there is a temperature difference between the first end portion and the second, the heat/acoustic wave conversion component oscillating the working fluid in the extending direction in accordance with the temperature difference and generating acoustic waves; and a pair of heat exchangers that are disposed in a vicinity of the first end portion and the second end portion of the heat/acoustic wave conversion component, respectively, the heat exchangers exchanging heat with the both end portions to give a temperature difference between the both end portions.

10. A heat/acoustic wave conversion unit comprising:
the heat/acoustic wave conversion component according to claim 2, in a state where inside of the plurality of cells is filled with the working fluid, and when the working fluid oscillates in the extending direction while receiving acoustic waves transmitted, the heat/acoustic wave conversion component generating a temperature difference between the first end portion and the second end portion in accordance with oscillations of the working fluid;

a heat exchanger that is disposed in a vicinity of one of the first end portion and the second end portion of the heat/acoustic wave conversion component, the heat exchanger supplying heat to the one end portion or absorbing heat from the one end portion to keep a temperature at the one end portion constant; and a hot heat/cold heat output unit that is disposed in a vicinity of the other of the first end portion and the second end portion of the heat/acoustic wave conversion component, the hot heat/cold heat output unit outputting hot heat or cold heat obtained by exchanging of heat with the other end portion so that, in a state where the temperature of the one end portion is kept constant by the heat exchanger and when the heat/acoustic wave conversion component receives acoustic waves transmitted, the other end portion has a temperature difference in accordance with oscillations of the working fluid due to transmission of the acoustic waves with reference to the one end portion kept at the constant temperature.

11. A heat/acoustic wave conversion unit, comprising the heat/acoustic wave conversion component according to claim 1, in a state where inside of the plurality of cells is filled with the working fluid and when there is a temperature difference between the first end portion and the second, the heat/acoustic wave conversion component oscillating the working fluid in the extending direction in accordance with the temperature difference and generating acoustic waves; and
  a pair of heat exchangers that are disposed in a vicinity of the first end portion and the second end portion of the heat/acoustic wave conversion component, respectively, the heat exchangers exchanging heat with the both end portions to give a temperature difference between the both end portions.

12. A heat/acoustic wave conversion unit comprising:
  the heat/acoustic wave conversion component according to claim 1, in a state where inside of the plurality of cells is filled with the working fluid, and when the working fluid oscillates in the extending direction while receiving acoustic waves transmitted, the heat/acoustic wave conversion component generating a temperature difference between the first end portion and the second end portion in accordance with oscillations of the working fluid;
  a heat exchanger that is disposed in a vicinity of one of the first end portion and the second end portion of the heat/acoustic wave conversion component, the heat exchanger supplying heat to the one end portion or absorbing heat from the one end portion to keep a temperature at the one end portion constant; and
  a hot heat/cold heat output unit that is disposed in a vicinity of the other of the first end portion and the second end portion of the heat/acoustic wave conversion component, the hot heat/cold heat output unit outputting hot heat or cold heat obtained by exchanging of heat with the other end portion so that, in a state where the temperature of the one end portion is kept constant by the heat exchanger and when the heat/acoustic wave conversion component receives acoustic waves transmitted, the other end portion has a temperature difference in accordance with oscillations of the working fluid due to transmission of the acoustic waves with reference to the one end portion kept at the constant temperature.

* * * * *